US012062329B2

(12) United States Patent
Ma et al.

(10) Patent No.: US 12,062,329 B2
(45) Date of Patent: Aug. 13, 2024

(54) SOURCE DRIVER AND DRIVING SYSTEM FOR DRIVING LED PANEL, AND DISPLAY SYSTEM

(71) Applicant: NOVATEK MICROELECTRONICS CORP., Hsinchu (TW)

(72) Inventors: Yu-Sheng Ma, Taichung (TW); Jhih-Siou Cheng, New Taipei (TW); Chun-Fu Lin, Taoyuan (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 18/139,682

(22) Filed: Apr. 26, 2023

(65) Prior Publication Data

US 2023/0351948 A1 Nov. 2, 2023

Related U.S. Application Data

(60) Provisional application No. 63/336,272, filed on Apr. 28, 2022.

(30) Foreign Application Priority Data

Apr. 19, 2023 (CN) ........................ 202310422742.2
Apr. 21, 2023 (TW) ................................ 112114961

(51) Int. Cl.
*G09G 3/32* (2016.01)

(52) U.S. Cl.
CPC ........... *G09G 3/32* (2013.01); *G09G 2300/06* (2013.01); *G09G 2310/0202* (2013.01); *G09G 2310/0272* (2013.01); *G09G 2320/0233* (2013.01); *G09G 2330/025* (2013.01)

(58) Field of Classification Search
None
See application file for complete search history.

(56) References Cited

U.S. PATENT DOCUMENTS 11,670,224 B1 * 6/2023 Cheng ...................... G09G 3/32
345/212

* cited by examiner

*Primary Examiner* — Christopher J Kohlman
(74) *Attorney, Agent, or Firm* — MARSHALL, GERSTEIN & BORUN LLP

(57) ABSTRACT

A source driver and a driving system for driving an LED panel, and an LED display system are provided. The driving system includes: a plurality of source drivers, for respectively supplying driving currents to channels of different portions on the LED panel, and each source driver includes: a plurality of driving circuits, which are in one-to-one correspondence with the plurality of channels on the LED panel, and are connected to a same current control line, each driving circuit being configured to supply a driving current to a corresponding channel, wherein, the supplied driving current is associated with a voltage on the current control line which the driving circuit is connected with. When one or more driving circuits switch between a non-driving state and a driving state, the driving current being supplied by the driving circuit(s) being in the driving state in the plurality of source drivers is compensated.

20 Claims, 12 Drawing Sheets

500

SOURCE DRIVER AND DRIVING SYSTEM FOR DRIVING LED PANEL, AND DISPLAY SYSTEM

TECHNICAL FIELD

The present disclosure relates to a field of display technologies, and more particularly, to a source driver and a driving system for driving an LED panel, and an LED display system.

BACKGROUND

When a Light Emitting Diode (LED) panel is driven, in a passive matrix driving mode, anodes of pixels on each column of a pixel array (i.e., an LED array) of the LED panel are connected to a data line (also referred to as a channel according to the present disclosure) driven by the source driver, and meanwhile, cathodes of pixels on each row are connected to a scanning line to be grounded through a scanning switch. When a driving current is output to a channel connected with pixels on a certain column and the scanning switch connected with the pixels on a certain row is turned on and grounded, a pixel at an intersection of the certain row and the certain column will emit light.

However, when a channel is turned on (the source driver outputs a driving current to a pixel on a corresponding data line) or turned off (the source driver does not output the driving current to a pixel on a corresponding data line), other channels will be affected through capacitive coupling paths on the LED panel, thereby affecting brightness of pixels on the other channels.

Therefore, there is a need for a solution that may reduce impact on brightness of pixels on the other channels caused by the capacitive coupling paths on the LED panel when turning on or turning off at least one channel.

SUMMARY

According to one aspect of the present disclosure, there is provided a driving system for driving an LED panel. The driving system may include: a plurality of source drivers, for respectively supplying driving currents to channels of different portions on the LED panel, and each source driver includes: a plurality of driving circuits, which are in one-to-one correspondence with channels on the LED panel, and are connected to a same current control line, each driving circuit being configured to supply a driving current to a corresponding channel, and the supplied driving current being associated with a voltage on the current control line which the driving circuit is connected with; wherein, when one or more driving circuits in the plurality of source drivers switch between a non-driving state and a driving state, the driving current being supplied by a driving circuit of first type in the plurality of source drivers is compensated, wherein the driving circuit of first type is being in the driving state.

According to another aspect of the present disclosure, there is provided a source driver for driving an LED panel. The source driver includes: a plurality of driving circuits, which are in one-to-one correspondence with a plurality of channels on the LED panel, and are connected to a same current control line and a same common voltage bus, wherein, each driving circuit among the plurality of driving circuits includes: a bus capacitor, connected between the current control line and the common voltage bus; a driving current generating circuit, configured to supply a driving current to a corresponding channel according to a voltage on the current control line; and a compensating circuit, connected to the common voltage bus, and configured to adjust the voltage on the current control line through adjusting the voltage on the common voltage bus and via a path including the bus capacitor, when the driving circuit switches between a non-driving state and a driving state, so that the driving current being supplied by a driving circuit of first type among the plurality of driving circuits is compensated, wherein the driving circuit of first type is being in the driving state.

According to another aspect of the present disclosure, there is provided a source driver for driving an LED panel. The source driver includes: a plurality of driving circuits, which are in one-to-one correspondence with a plurality of channels on the LED panel, and are connected to a same current control line; and a controller, used for providing a driving control signal to each of the plurality of driving circuits, wherein, the driving control signal is used for indicating a driving state and a non-driving state of a corresponding driving circuit; wherein, each driving circuit includes a driving current generating circuit, which is configured to output a driving current according to a voltage on the current control line and the driving control signal provided by the controller; wherein, the controller is configured to: when one or more driving circuits among the plurality of driving circuits switch between the non-driving state and the driving state, adjust a driving state duration indicated by the driving control signal for a driving circuit of first type among the plurality of driving circuits, so that the driving current being supplied by the driving circuit of first type is compensated, wherein the driving circuit of first type is being in the driving state.

According to another aspect of the present disclosure, there is provided an LED display system, including: an LED panel, wherein, the LED panel includes a plurality of channels, and each channel is connected with a plurality of LEDs; and a driving system or a source driver as described above, used for driving the LED panel.

According to the embodiments of the present disclosure, by arranging a compensating circuit in each driving circuit included in at least one source driver and/or adjusting the driving state duration indicated by the driving control signal, when any one driving circuit or more driving circuits simultaneously switch between the driving state and the non-driving state, the driving current being supplied by a driving circuit (driving circuits) in the driving state in the at least one source driver on the corresponding channel(s) may be compensated, so as to reduce driving current changes and LED brightness changes, and further improve an LED display effect.

BRIEF DESCRIPTION OF THE DRAWINGS

The accompanying drawings show various embodiments of various aspects of the present disclosure, and they are used together with the specification to explain principles of the present disclosure. Those skilled in the art understand that the specific embodiments shown in the drawings are only illustrative, and they are not intended to limit the scope of the present disclosure.

DETAILED DESCRIPTION

Hereinafter, the implementation of the present disclosure will be described in detail in conjunction with the drawings and the embodiments, so as to fully understand and implement an implementation process of how the present disclosure uses technical means to solve technical problems and achieve technical effects. It should be noted that as long as there is no conflict, each embodiment and each feature of each embodiment in the present disclosure may be combined with each other, and the resulting technical solution is within the protection scope of the present disclosure.

Meanwhile, in the following description, many specific details are set forth for the purpose of interpretation to provide thorough understanding of the embodiments of the present disclosure. However, it is obvious to those skilled in the art that the present disclosure may be implemented without specific details herein or the specific modes described.

Figure 1:
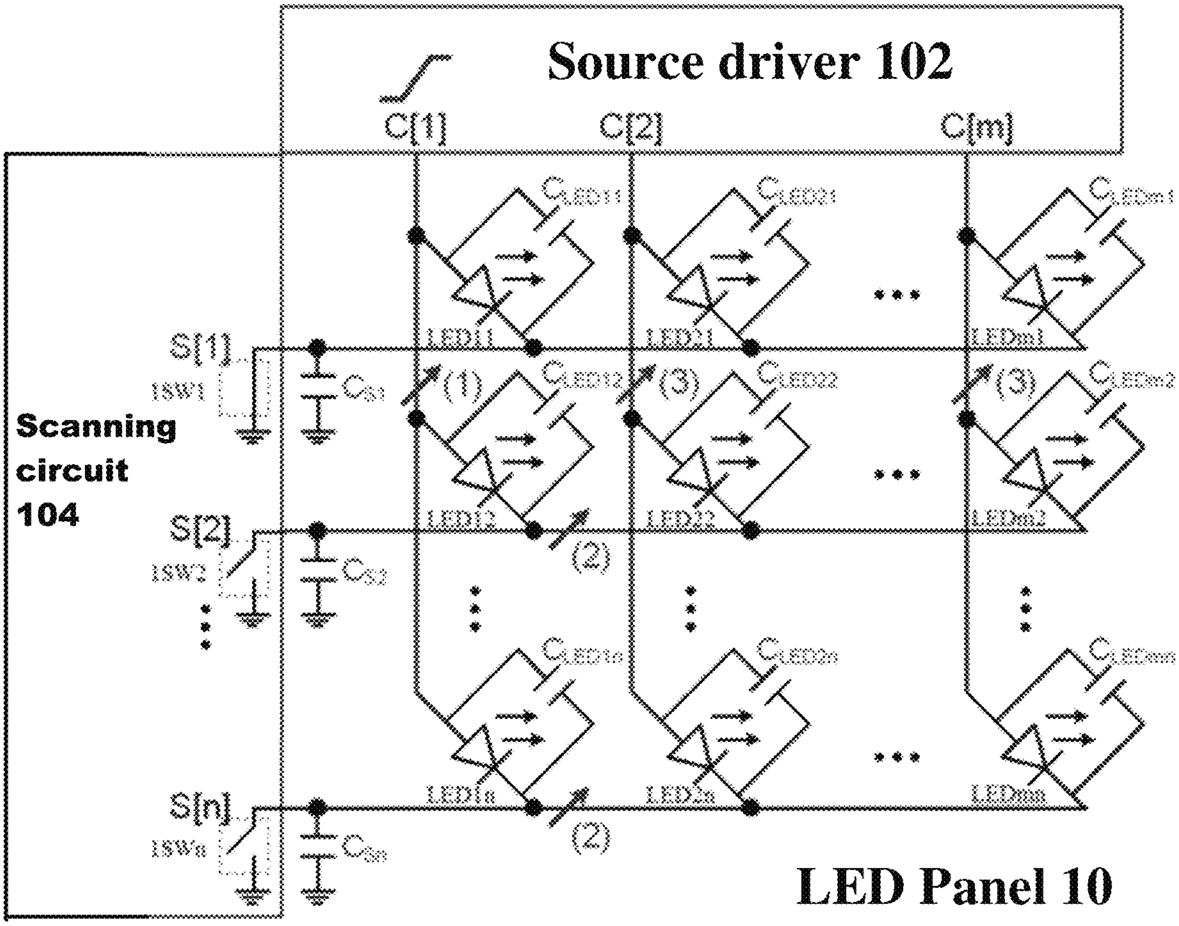
FIG. 1 is a schematic diagram of a passive matrix LED display system, in which an LED panel is driven based on a passive matrix driving mode.

FIG. 1 is a schematic diagram of a passive matrix LED display system, in which an LED panel 10 is driven based on a passive matrix driving mode.

As shown in FIG. 1, the passive matrix LED display system includes a source driver 102, a scanning circuit (also referred to as a gate driver) 104 and an LED panel 10. The LED panel 10 includes channels C[1] to C[m], scanning lines S[1] to S[n], scan capacitors CS1 to CSn, LED capacitors $C_{LED11}$ to $C_{LEDmn}$ and corresponding light emitting diodes (each light emitting diode is regarded as a pixel, or regarded as a sub-pixel of a multi-color pixel (e.g., an RGB pixel or an RGBW pixel)), where, m and n are integers. The source driver 102 is used for driving the channels C[1] to C[m], and the scanning circuit 104 is used for grounding the scanning lines S[1] to S[n] through respective scanning switches. It should be noted that although the LED capacitors $C_{LED11}$ to $C_{LEDmn}$ are shown in FIG. 1 as in a parallel connection with the corresponding light emitting diodes LED, the LED capacitors $C_{LED11}$ to $C_{LEDmn}$ are actually parasitic capacitors of the corresponding light emitting diodes LED.

When the scanning circuit 104 grounds one of the scanning lines S[1] to S[n], and the source driver 102 drives one of the channels C[1] to C[m], a corresponding LED (e.g., LED11 . . . or LEDmn) at an intersection may be turned on. For example, when the scanning circuit 104 grounds the scanning line S[1] and the source driver 102 drives the channel C[1], a voltage difference is formed on the LED 11, and the voltage difference is used for turning on the corresponding LED 11.

However, there are problems below: for example, when the source driver 102 starts to drive the channel C[1] (i.e., the channel C[1] switches from being turned off to being turned on), the voltage change (e.g., due to existence of the LED capacitors connected with the channel C[1] and parasitic capacitance on the channel, etc., supplying the driving current to the channel C[1] will cause a change in the voltage on the channel) is coupled to other channel(s) via the capacitive coupling paths on the LED panel (e.g., coupled to the channel C[2] via a path (1)→(2)→(3)), and at this time, the scanning line S[1] is grounded, which affects the voltage difference between two ends of the LED capacitors $C_{LED21}$ to $C_{LEDm1}$ on the other channel(s). If at least one channel among channels which the LED capacitors $C_{LED21}$ to $C_{LEDm1}$ are connected to is being supplied with a driving current, a current flowing through the LED corresponding to the at least one channel will be affected. In this way, the more the channels are driven simultaneously, i.e., the greater the number of channels switch from being turned off to being turned on at a time, the stronger the capacitive coupling on the LED panel 10, and the greater the impact on the voltage differences between two ends of the LED capacitors on the other channels being driven, the greater the changes of the currents flowing through corresponding LEDs, and the greater the brightness changes of the corresponding LEDs. In other words, in a case where the LED panel 10 is driven based on the passive matrix driving mode, when the source driver 102 starts to drive any one or more channels, driving currents on other channels will be affected due to the capacitive coupling paths on the LED panel.

In addition, in other embodiments, the passive matrix LED display system may include more than one source driver 102 and more than one scanning circuit 104, for example, in a case where there is a need to drive a large-sized LED panel.

Figure 2A:
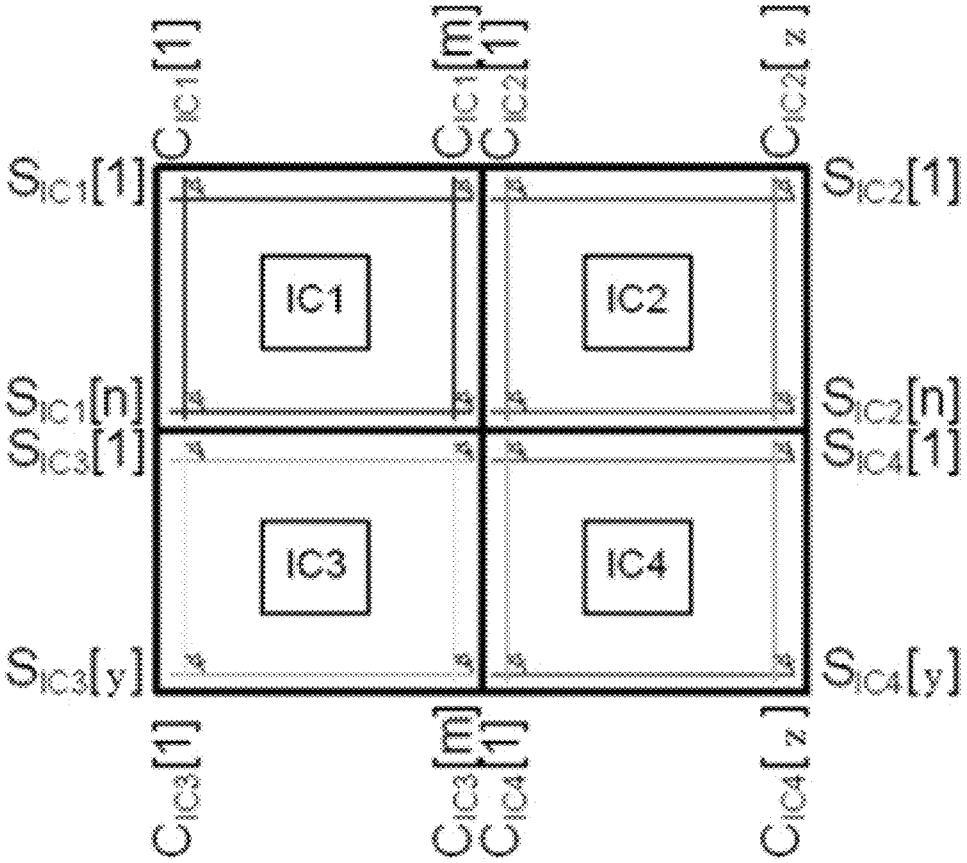
FIG. 2A shows a schematic layout when the passive matrix LED display system includes a plurality of source drivers and a plurality of scanning circuits.

For example, the passive matrix LED display system includes four source drivers 102 and four scanning circuits 104 as required. As shown in FIG. 2A, the four source drivers 102 may be implemented with four driver integrated circuits IC (IC1 to IC4), and the scanning circuit 104 is not shown in FIG. 2A. However, this is only an example, and the passive matrix LED display system may include more or less source drivers 102 and scanning circuits 104.

Figure 2B:
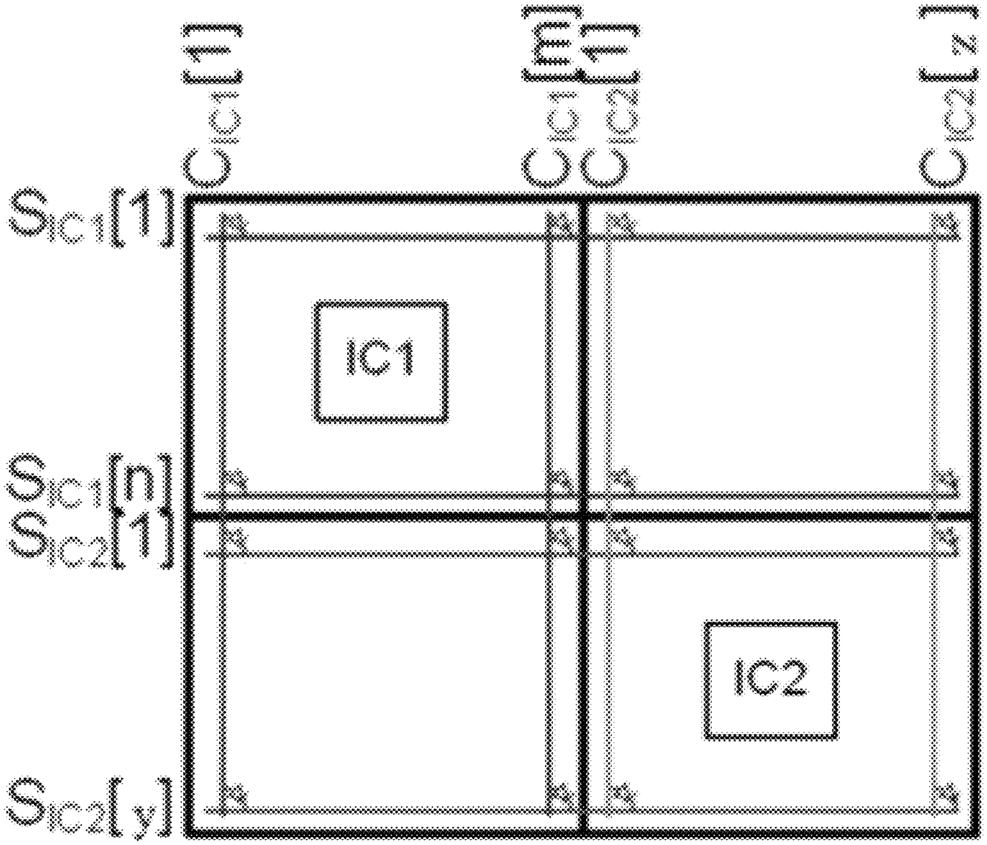
FIG. 2B shows a schematic layout based on a common scan structure when the passive matrix LED display system includes a plurality of source drivers and a plurality of scanning circuits.

In addition, in order to reduce the number of source drivers 102 and thus reduce costs, a common scan structure in which scanning lines are shared may be used, that is, scanning lines are shared between source drivers 102 or shared between ICs in a case where the source drivers 102 are implemented in ICs. Taking the common scan structure implemented between two source drivers (ICs) as an example, as shown in FIG. 2B, the (m+z) channels $C_{IC1}$[1] to $C_{IC1}$[m] and $C_{IC2}$[1] to $C_{IC2}$[z] corresponding to IC1 and IC2 share (n+y) scanning lines $S_{IC1}$[1] to $S_{IC1}$[n] and $S_{IC2}$[1] to $S_{IC2}$[y]. In this case, when the number of channels corresponding to a certain scanning line (e.g., the channels $C_{IC1}$[1] to $C_{IC1}$[m] and $C_{IC2}$[1] to $C_{IC2}$[z] corresponding to the scanning line $S_{IC1}$[1]) is doubled, the number of ICs of the source drivers 102 may be halved, that is, from 4 source drivers (4 ICs) shown in FIG. 2A to 2 source drivers (2 ICs) shown in FIG. 2B.

Figure 3:
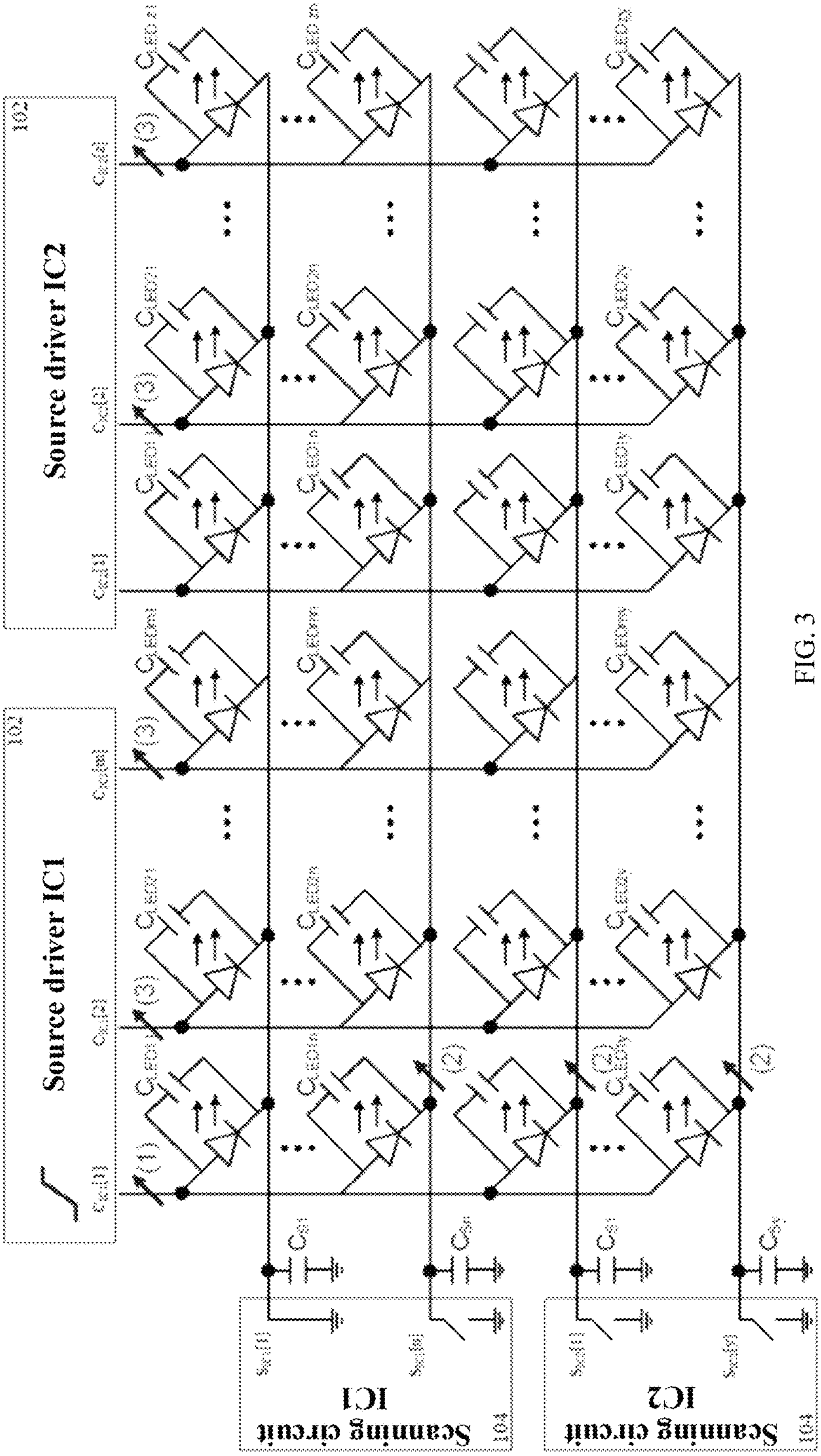
FIG. 3 shows a more detailed schematic diagram of the passive matrix LED display system of FIG. 2B.

FIG. 3 shows a more detailed schematic diagram of the passive matrix LED display system of FIG. 2B.

As shown in FIG. 3, still taking that the source drivers 102 are implemented in IC as an example (of course, the same is true if the source drivers 102 are not implemented in IC), the source drivers IC1 and IC2 are respectively used for driving channels of different portions on the LED panel, that is, the source driver IC1 is used for driving the channels $C_{IC1}$[1] to $C_{IC1}$[m], and the source driver IC2 is used for driving the channels $C_{IC2}$[1] to $C_{IC2}$[z]. The scanning lines $S_{IC1}$[1] to $S_{IC2}$[y] are shared between the source drivers IC1 and IC2, where, m, y and z are integers. For example, the source driver IC1 may include m driving circuits for respectively driving the channels $C_{IC1}$[1] to $C_{IC1}$[m], and the source driver IC2 may include z driving circuits for respectively driving the channels $C_{IC2}$[1] to $C_{IC2}$[z]. Each driving circuit may operate in a driving state (i.e., supplying a driving current to a corresponding channel or driving the channel) and in a non-driving state (i.e., not supplying a driving current to a corresponding channel or not driving the channel). In the context of present application, in order to facilitate description, a driving circuit being in the driving state when any driving circuit performs state switching is referred to as the driving circuit of first type, and a driving circuit in the non-driving state when any driving circuit performs state switching is referred to as the driving circuit of second type.

Since different source driver ICs share scanning lines under the common scan structure, driving any channel by a source driver IC will affect channels driven by other source driver ICs. For example, as shown in FIG. 3, when the source driver IC1 starts to drive the channel $C_{IC1}$[1](i.e., the channel $C_{IC1}$[1] switches from being turned off to being turned on), a voltage change is coupled to other channels (e.g., the channels $C_{IC1}$[2] to $C_{IC1}$[m] of the source driver IC1 and the channel $C_{IC2}$[1] to $C_{IC2}$[z] of the source driver IC2) via capacitive coupling paths (e.g., the path (1)→(2)→(3)) on the LED panel. Meanwhile, the scanning line $S_{IC1}$[1] for the source driver IC1 is grounded. As a result, voltage differences between two ends of the LED capacitors $C_{LED21}$ to $C_{LEDm1}$ corresponding to the source driver IC1 and the LED capacitors $C_{LED11}$ to $C_{LEDz1}$ corresponding to the source driver IC2 may change, which may affect currents flowing through the LEDs on the channels being driven (i.e., affect the driving currents on the channels). The greater the number of channels are driven simultaneously, i.e., the greater the number of channels switch from being turned off to being turned on at a time, the stronger the capacitive coupling on the LED panel 10, and the greater the impact on the voltage differences between two ends of the LED capacitors on the other channels, then the greater the changes of the currents flowing through LEDs corresponding to the channels being driven, and the greater the brightness changes of the corresponding LEDs.

It may be known from the above-described description that regardless of whether the passive matrix LED display system includes one source driver or multiple source drivers, when the source driver starts to drive one or more channels, existence of the capacitive coupling paths on the LED panel will affect light emission brightness of the LEDs on another channel or other channels being driven.

Therefore, the embodiment of the present disclosure provides a solution for solving mutual influence between channels caused by the capacitive coupling paths on the LED panel.

Figure 4:
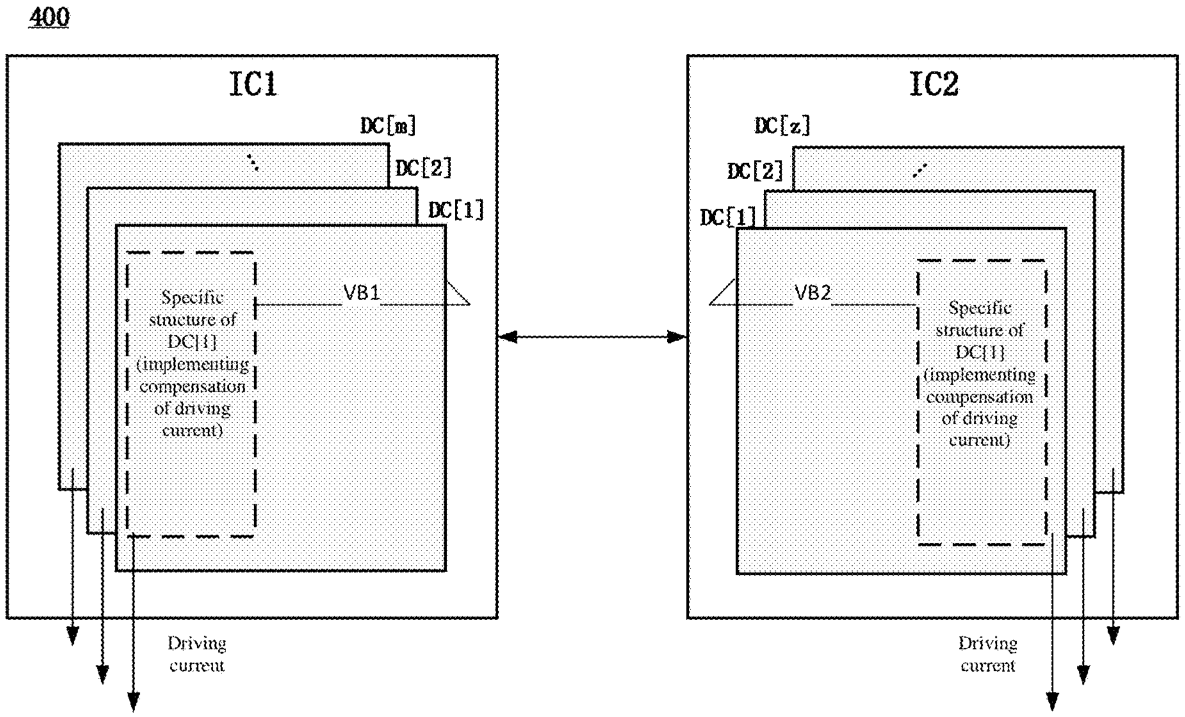
FIG. 4 shows a structural block diagram of a driving system for driving an LED panel according to an embodiment of the present disclosure.

FIG. 4 shows a structural block diagram of a driving system for driving an LED panel according to an embodiment of the present disclosure.

The driving system 400 may include a plurality of source drivers (e.g., FIG. 4 shows two source drivers by using IC1 and IC2, but it should be understood that the number of source drivers may be greater), which are used for respectively supplying driving currents to channels in different portions on the LED panel, for example, as shown in FIG. 3, the source driver IC1 are used to supply driving currents to channels $C_{IC1}$[1] to $C_{IC1}$[m], and the source driver IC2 are used to supply driving currents to the channels $C_{IC2}$[1] to $C_{IC2}$[z].

Each source driver includes a plurality of driving circuits (represented by DC[1], DC[2], etc.), which are in one-to-one correspondence with the plurality of channels on the LED panel. For example, in conjunction with FIG. 3, the driving circuits DC[1] to DC[m] in the source driver IC1 are in one-to-one correspondence with the channels $C_{IC1}$[1] to $C_{IC1}$[m], and the driving circuits DC[1] to DC[z] in the source driver IC2 are in one-to-one correspondence with the channels $C_{IC2}$[1] to $C_{IC2}$[z]. The driving circuits DC[1] to DC[m] of the source driver IC1 and the driving circuits DC[1] to DC[z] of the source driver IC2 may have same structures and components.

The plurality of driving circuits included in each source driver are connected to a same current control line. Each driving circuit is used for supplying a driving current to a corresponding channel, wherein, the supplied driving current is associated with a voltage on the current control line which the driving circuit is connected with. For example, driving currents respectively output by the driving circuits DC[1] to DC[m] in the source driver IC1 are associated with the voltage on the current control line VB1, and driving currents respectively output by the driving circuits DC[1] to DC[y] in the source driver IC2 are associated with the voltage on the current control line VB2.

According to the embodiment of the present disclosure, when one or more driving circuits in the plurality of source drivers included in the driving system 400 switch between a non-driving state and a driving state, the driving current being supplied by a driving circuit(s) being in the driving state (driving circuit(s) of first type) in the plurality of source drivers included in the driving system 400 is compensated, so as to compensate light emission changes of the LEDs on the channels driven by the driving circuit(s) of first type due to the capacitive coupling paths on the LED panel. At this time, because the driving circuit(s) in the non-driving state (driving circuit(s) of second type) is not supplying the driving current to its corresponding channel, there is no need to consider the impact of switching process of another driving circuit between the non-driving state and the driving state on its corresponding channel.

As described above with reference to FIG. 2B to FIG. 3, with respect to any driving circuit DC[i] in any source driver, where, i is an integer greater than 1, when it switches between supplying a driving current to a channel C[i] (the driving circuit DC[i] being in the driving state) and not supplying a driving current to the channel C[i] (the driving circuit DC[i] being in the non-driving state), due to existence of the LED capacitors connected on the channel C[i] and parasitic capacitance on the channel C[i], a voltage on the channel C[i] will change, so that the voltage(s) on another channel or other channels (including the other channel(s) driven by a same source driver and the other channel(s) driven by other source drivers) will be affected via the capacitive coupling paths between channels. If at least one channel among the other channels is being supplied with a driving current by its corresponding driving circuit, a sudden change in current value for the driving current being supplied will occur. Therefore, in such case, it is necessary to compensate the driving current being supplied by its corresponding driving circuit to compensate for the sudden change in current value.

That is to say, while a certain driving circuit or certain driving circuits switch(es) between a non-driving state and a driving state, the driving current being supplied by a driving circuit(s) of first type may be timely compensated, so that the current value of the driving current being supplied by the driving circuit(s) of first type may be basically constant, and thus brightness of the LED(s) on the channel(s) driven by the driving circuit(s) of first type will basically not be affected.

As an exemplary embodiment, since a driving current supplied by each driving circuit is associated with a voltage on the current control line which the driving circuit is connected with, the driving current supplied by the driving circuit may be compensated by adjusting the voltage on the current control line. In addition, all driving circuits in each source driver are connected to a same current control line. For example, the current control line may be connected to an output end of a buffer to supply the voltage at the output end of the buffer to all driving circuits in the source driver.

Figure 5:
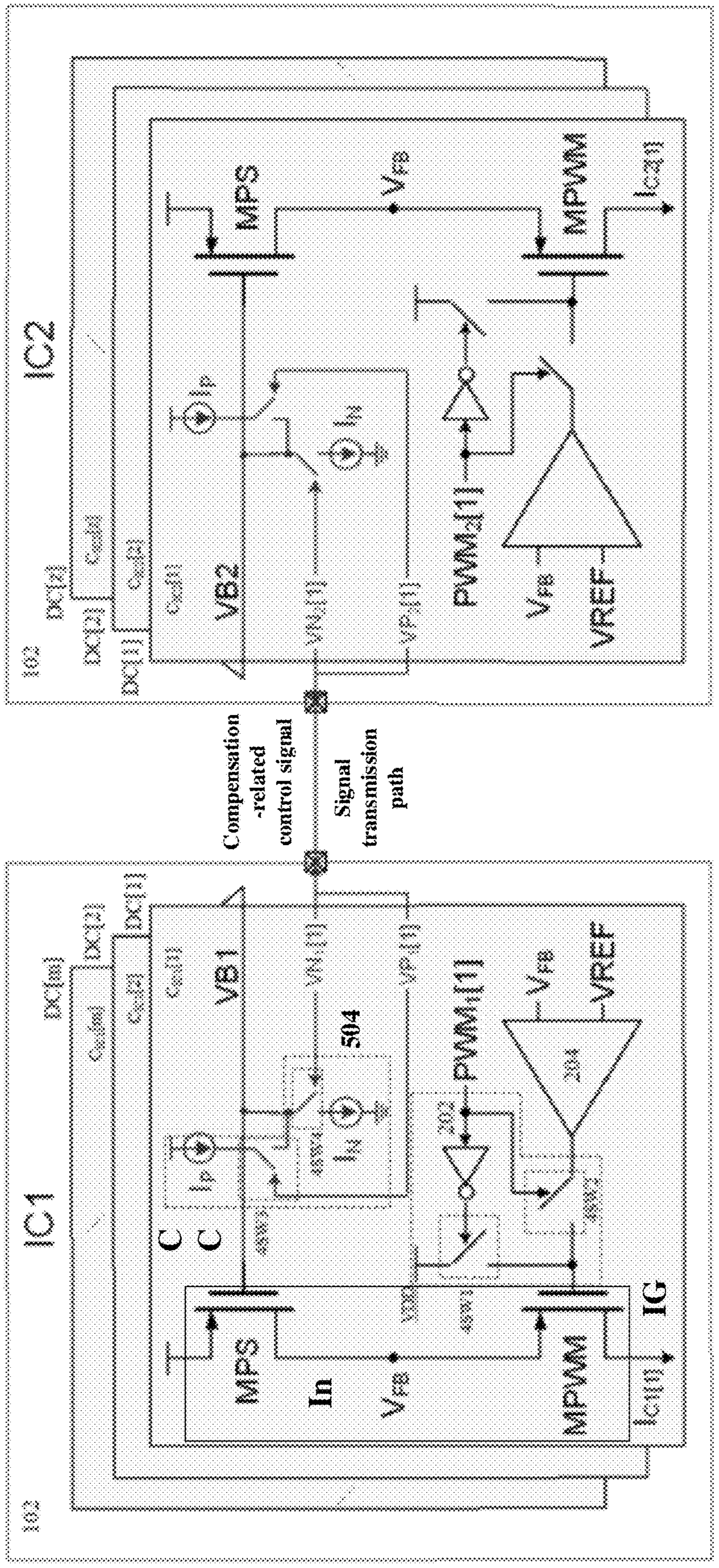
FIG. 5 shows a circuit schematic diagram of the driving system for driving the LED panel according to the embodiment of the present disclosure.

In such case, as further shown in FIG. 5, each driving circuit may include: a driving current generating circuit (shown as IG), configured to supply a driving current to a corresponding channel according to the voltage of the current control line which the driving circuit is connected with; and a compensating circuit (shown as CC), configured to adjust the voltage on the current control line which the driving circuit is connected with when the driving circuit switches between the non-driving state and the driving state.

As an example of the driving current generating circuit IG, as shown in FIG. 5, the driving current generating circuit IG included in each driving circuit DC[i] may include: a driving current source and a driving current outputting circuit.

The driving current source is configured to supply a first current In according to the voltage on the connected current control line VB (e.g., VB1 in IC1, VB2 in IC2, which may be collectively referred to as VB).

Optionally, as shown in FIG. 5, the driving current source may include a constant-current transistor MPS. For example, the voltage on the current control line which the driving circuit DC[i] is connected with may control the constant-current transistor MPS (which is used as a constant-current source) to output the first current In. An amplitude value of the first current In may depend on the voltage on the current control line which the driving circuit DC[i] is connected with.

The driving current outputting circuit may be configured to acquire the first current In and output the driving current based on the first current In and according to a driving control signal (e.g., a PWM signal). The driving control signal is used for indicating the driving state and the non-driving state of the driving circuit DC[i], that is, whether to output the driving current. For example, an active level and an inactive level of the PWM signal respectively indicate the driving state and the non-driving state of the driving circuit DC[i]. It should be understood that light emission brightness of the LED on the channel corresponding to each driving circuit DC[i] may be determined by a driving state duration indicated by the driving control signal (e.g., a pulse width (or a duty cycle) of the PWM signal) for the driving circuit DC[i] and the amplitude value of the first current In supplied by the driving current source.

Optionally, as shown in FIG. 5, in a case where the driving control signal is a PWM signal, the driving current outputting circuit may include a transistor, for example, a Pulse Width Modulation (PWM) transistor MPWM. The PWM transistor MPWM of the driving circuit DC[i] is turned on to output the driving current IC[i] (e.g., $I_{C1}$[1] in the source driver IC1 in FIG. 5) to the corresponding channel. The driving current IC[i] is configured to drive one corresponding LED (one LED on the channel) in each scanning cycle. Taking the driving circuit DC[1] as an example, the driving circuit DC[1] further includes a PWM circuit 202, which may control the PWM transistor MPWM to turn on or turn off according to the PWM signal $PWM_1$[1], so as to turn on or turn off the channel $C_{IC1}$[1] (supply or not supply the driving current to the channel). The PWM circuit 202 may receive the PWM signal $PWM_1$[1] and generate an inverted signal through an inverter. A switch 4SW1 connected between a system voltage VDD and a gate electrode of the PWM transistor MPWM is configured to control the gate electrode of the PWM transistor MPWM to be at a high level (e.g., the system voltage VDD) (to turn on the PWM transistor MPWM) or be at a low level (to turn off the PWM transistor MPWM) in response to the inverted signal. The PWM circuit 202 includes another switch 4SW2 connected between an output end of the amplifier 204 and the gate electrode of the PWM transistor MPWM. When the PWM signal $PWM_1$[1] is at the high level to turn on the PWM transistor MPWM, the switch 4SW2 controlled by the PWM signal $PWM_1$[1] may form a negative feedback loop to lock a source voltage (i.e., a node voltage VFB) of the PWM transistor MPWM at a reference voltage VREF by using the amplifier 204 of the driving circuit DC[1]. A PWM signal of each driving circuit comes from the controller (e.g., which is implemented in a form of hardware, software or a combination of the two) in the source driver where the driving circuit is located.

In addition, as an example of the compensating circuit, as shown in FIG. 5, a compensating circuit included in each driving circuit DC[i] is connected to the current control line which the driving circuit DC[i] is connected with, that is, compensation of the other driving current(s) being supplied by the driving circuit(s) being in the driving state (driving circuit(s) of first type) is completed by adjusting the voltage on the current control line which the driving circuit DC[i] is connected with. In addition, the compensating circuit may be configured to: adjust the voltage on the current control line which the driving circuit DC[i] is connected with when the driving circuit DC[i] switches from the non-driving state to the driving state, and/or when the driving circuit DC[i] switches from the driving state to the non-driving state, so that the current value of the first current In may be adjusted. In such case, a driving state duration indicated by the driving control signal (e.g., the pulse width of the PWM signal) supplied to each driving circuit is kept unchanged, and the compensation process is implemented only by adjusting the current value of the first current In.

Optionally, taking that the constant-current transistor MPS being a P-type transistor as an example, when the driving circuit DC[i] switches from the non-driving state to the driving state, the greater the number of the driving circuit(s) of first type, the lower the voltage on the current control line which the driving circuit DC[i] is connected with; and the less the number of the driving circuit(s) of first type, the higher the voltage on the current control line which the driving circuit DC[i] is connected with. When the driving circuit DC[i] switches from the driving state to the non-driving state, the greater the number of the driving circuit(s) of first type, the higher the voltage on the current control line which the driving circuit DC[i] is connected with; and the less the number of the driving circuit(s) of first type, the lower the voltage on the current control line which the driving circuit DC[i] is connected with.

Optionally, the compensating circuit may include: a voltage adjusting sub-circuit, configured to increase the voltage on the current control line VB which the driving circuit DC[i] is connected with according to a first control signal, or decrease the voltage on the current control line VB which the driving circuit DC[i] is connected with according to a second control signal.

For example, the voltage adjusting sub-circuit may include a charging circuit and a discharging circuit. The charging circuit may be configured to charge the current control line VB according to the above-described first control signal $VP_1$, so as to increase the voltage on the current control line VB, and the discharging circuit is configured to discharge the current control line VB according to the second control signal $VN_1$, so as to reduce the voltage on the current control line VB. Optionally, the first control signal $VP_1$ and the second control signal $VN_1$ may be pulse signals, and may be generated by a controller for generating the driving control signal in each source driver or another independent controller. In the present disclosure, the first control signal and the second control signal for the first driving circuit DC[1] in each source driver are respectively represented as $VP_1$[1] and $VN_1$[1]; $VP_2$[1] and $VN_2$[1]; . . . $VP_{NUM}$[1] and $VN_{NUM}$[1], wherein, NUM is the number of source drivers, and the first control signal and the second control signal for the other driving circuit(s) in each source driver are represented in a similar manner, for example, $VP_1$[2] and $VN_1$[2]; $VP_2$[2] and $VN_2$[2]; . . . $VP_{NUM}$[2] and $VN_{NUM}$[2].

The voltage adjusting sub-circuit (the charging circuit and the discharging circuit) shown in FIG. 5 includes current sources and switches for implementation, but the compensating circuit may be implemented by any combination of metal oxide semiconductor field-effect transistor switches, diodes, source followers, operational amplifiers, current sources and other circuits.

Figure 7:
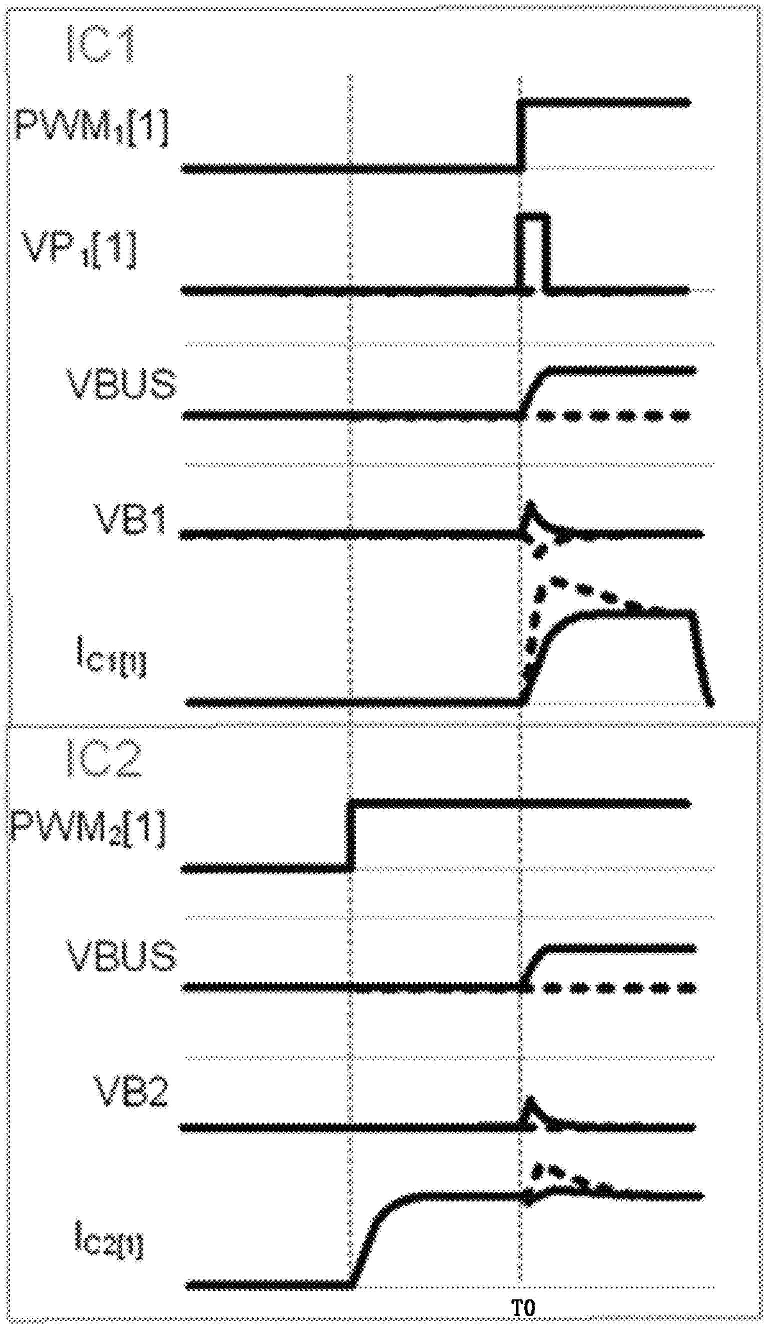
FIG. 7 shows changes of respective electrical parameters when the driving circuit DC[1] in the source driver IC1 switches from a non-driving state to a driving state in the driving system shown in FIG. 6.
Figure 8:
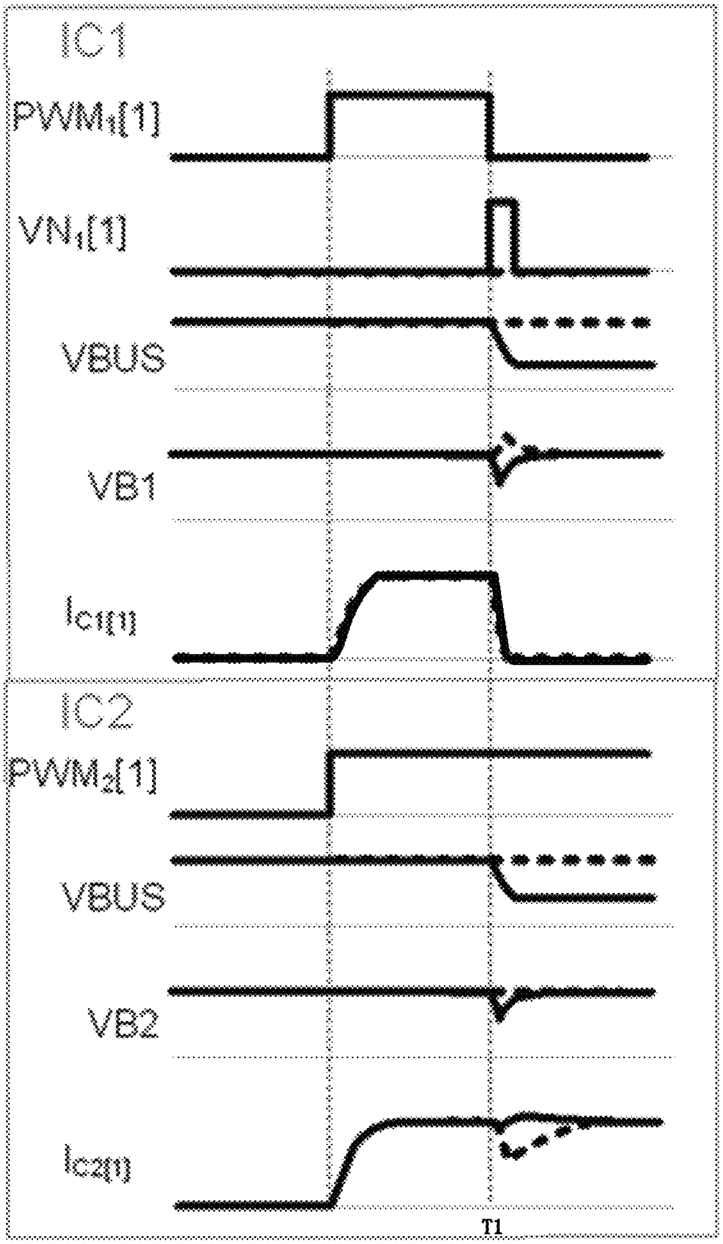
FIG. 8 shows changes of respective electrical parameters when the driving circuit DC[1] in the source driver IC1 switches from the driving state to the non-driving state in the driving system shown in FIG. 6.

Actually, referring to FIG. 5, when the driving circuit DC[i] switches between the driving state and the non-driving state based on the driving control signal to turn on or turn off the channel C[i], light emission brightness of the LED on the channel is determined by the driving state duration indicated by the driving control signal (e.g., the pulse width of the PWM signal) and the first current In supplied by the constant-current transistor MPS (the constant-current source). When the transistor controlled by the driving control signal (e.g., the pulse width modulation transistor MPWM) switches from being turned on to being turned off, the node voltage VFB at a node of the transistor where the current flows into will instantaneously increase to the system voltage VDD, or when the transistor switches from being turned off to being turned on, the node voltage VFB will instantaneously decrease to the reference voltage VREF after negative feedback via the amplifier 204, then the instantaneous increase or decrease of the node voltage VFB will interfere with the node voltage of the gate electrode of the constant-current transistor MPS through the parasitic capacitance between the gate electrode and drain electrode of the constant-current transistor MPS (taking the constant-current transistor MPS being a P-type transistor as an example), which will cause the voltage on the current control line to instantaneously increase or decrease (as shown in a dashed line curve of the voltage VB1 on the current control line in FIG. 7 and FIG. 8 shown later).

Therefore, when the voltage on the current control line which the driving circuit DC[i] is connected with is adjusted through the compensating circuit, fluctuation of the node voltage of the gate electrode of the constant-current transistor MPS of the driving circuit DC[i] may be compensated while compensating the sudden change of the driving current(s) being supplied by the driving circuit(s) of first type in the source driver in which the driving circuit DC[i] is included.

In addition, with respect to the driving circuit(s) of first type located in different source drivers from the source driver in which the driving circuit DC[i] is included, when the driving circuit DC[i] switches between the non-driving state and the driving state, because the driving current(s) being supplied by the driving circuit(s) of first type in another source driver or other source drivers also needs to be compensated, a signal transmission path (wired or wireless path) may be arranged between the plurality of source drivers included in the driving system 500, so that the plurality of source drivers may transmit compensation-related control signals to each other. For example, the compensation-related control signal may be used for adjusting the voltage on the current control line in other source driver(s), so that compensation of the driving current(s) being supplied by the driving circuits of respective source drivers may be implemented synchronously. For example, the first control signal or the second control signal, as the compensation-related control signal, applied to the driving circuit DC[i] may be transmitted from the source driver in which the driving circuit DC[i] is included to the other source driver(s) via the signal transmission path (in a wired or wireless manner) between different source drivers. For example, taking the driving circuit DC[1] as an example, the control signal $VP_2$[1] or $VN_2$[1] for the source driver IC2 may switch between the low voltage level and the high voltage level in response to the control signal $VP_1$[1] or $VN_1$[1] transmitted from the source driver IC1, to compensate the driving current(s) being supplied by the driving circuit(s) of first type in the source driver IC2. That is to say, when the compensating circuit 504 of the driving circuit DC[i] of the source driver IC1 functions, if the driving currents $I_{C1[2]}$ to $I_{C1[m]}$ are being supplied by the driving circuits of first type in the source driver IC1 and the driving currents $I_{C2[1]}$ to $I_{C2[2]}$ are being supplied by the driving circuits of first type in the other source driver(s), for example, IC2, the driving currents $I_{C1[2]}$ to $I_{C1[m]}$ and driving currents $I_{C2[1]}$ to $I_{C2[z]}$ may be compensated.

In the driving circuit as described with reference to FIG. 5, as an example, the compensating circuit directly adjusts the voltage on the current control line (e.g., VB2, VB3, . . . ), and the compensation-related control signal is transmitted between the plurality of source drivers, so that the driving current(s) being supplied by the driving circuit(s) of first type in respective source drivers are compensated. In another example of the driving circuit, the voltage on the current control line may be adjusted by arranging a common voltage bus, and a voltage signal may be transmitted between the plurality of source drivers of the driving system via the common voltage bus, so as to compensate the driving current(s) being supplied by the driving circuit(s) of first type in respective source drivers.

Figure 6:
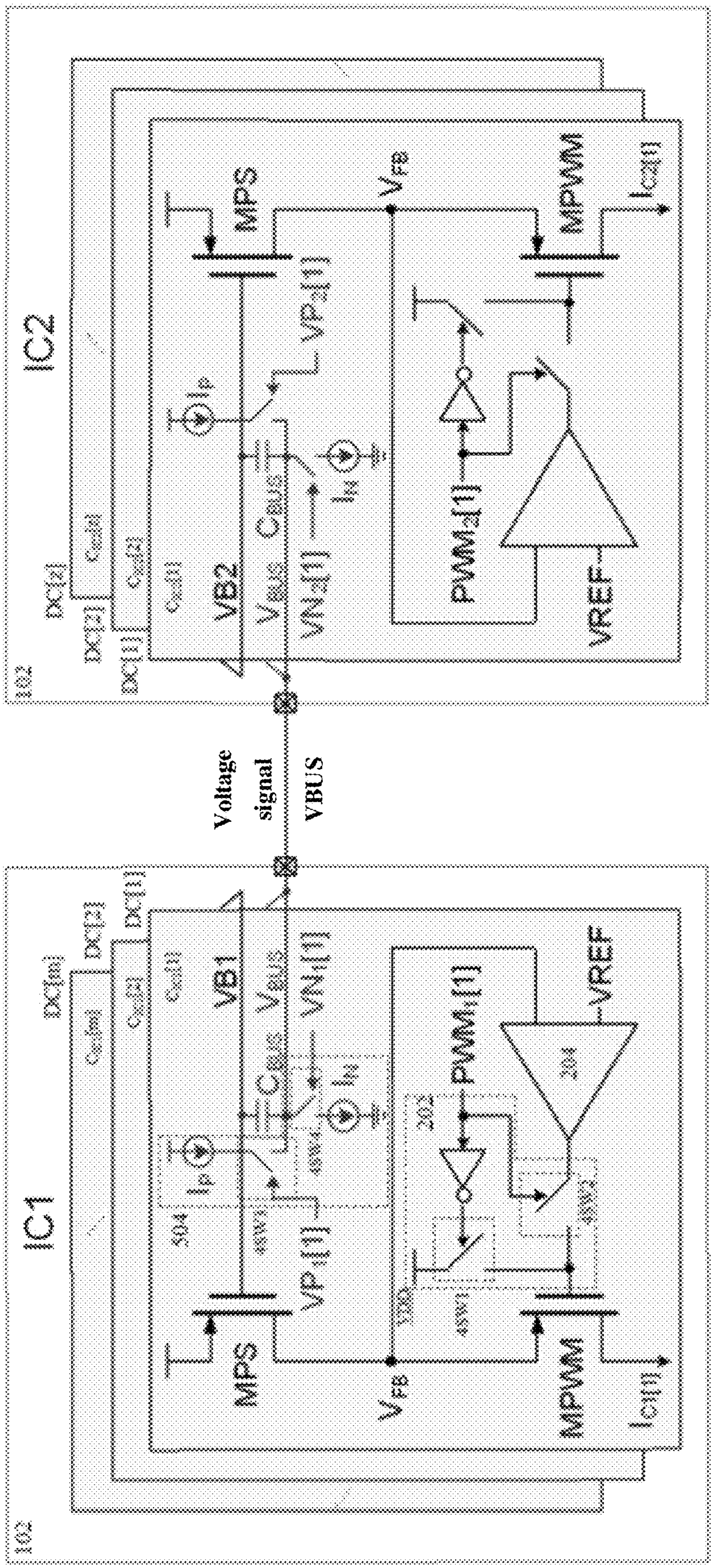
FIG. 6 shows a circuit schematic diagram of a driving system for driving an LED panel according to another embodiment of the present disclosure.

FIG. 6 shows a circuit schematic diagram of a driving system for driving an LED panel according to another embodiment of the present disclosure.

As shown in FIG. 6, as compared with the driving system shown in FIG. 5, the driving system may further include a common voltage bus VBUS, which is connected between the plurality of source drivers included in the driving system.

A plurality of driving circuits (DC[1], DC[2], . . . ) included in each source driver are also connected to the common voltage bus VBUS, and each driving circuit DC[i] further includes a bus capacitor CBUS connected between the current control line VB (e.g., VB1, VB2, etc.) which the driving circuit DC[i] is connected with and the common voltage bus VBUS. For example, each driving circuit DC[i] among the plurality of driving circuits (DC[1], DC[2], . . . ) included in the source driver IC1 further includes a bus capacitor CBUS connected between the current control line VB1 and the common voltage bus VBUS; each driving circuit DC[i] among the plurality of driving circuits (DC[1], DC[2], . . . ) included in the source driver IC2 further includes a bus capacitor CBUS connected between the current control line VB2 and the common voltage bus VBUS.

A compensating circuit included in each driving circuit DC[i] is connected to the common voltage bus VBUS, and is also configured to adjust the voltage on the current control line in each source driver via a path including the bus capacitor $C_{BUS}$, by adjusting the voltage on the common voltage bus VBUS. In other words, by adjusting the voltage on the common voltage bus VBUS, the voltages on the current control lines of all source drivers in the driving system are adjusted accordingly and have approximately a same value, so that the driving currents being supplied by the driving circuits of first type in all source drivers may be compensated.

For example, as shown in FIG. 6, a compensating circuit included in each driving circuit DC[i] includes a voltage adjusting sub-circuit, and the voltage adjusting sub-circuit may be configured to: increase the voltage on the common voltage bus VBUS according to a first control signal (e.g., $VP_1$[1] or $VP_2$[1]) to increase the voltage on the current control line in each source driver; or decrease the voltage on the common voltage bus VBUS according to a second control signal (e.g., $VN_1$[1] or $VN_2$[1]) to decrease the voltage on the current control line in each source driver.

Similarly, the voltage adjusting sub-circuit may include a charging circuit and a discharging circuit. The charging circuit is configured to charge the common voltage bus according to the first control signal, so as to increase the voltage on the common voltage bus; and the discharging circuit is configured to discharge the common voltage bus according to the second control signal, so as to decrease the voltage on the common voltage bus. The voltage adjusting sub-circuit (the charging circuit and the discharging circuit) may include current sources and switches, and may also be implemented by any combination of metal oxide semiconductor field-effect transistor switches, diodes, source followers, operational amplifiers, current sources and other circuits.

In addition, as shown in FIG. 6, different source drivers and driving circuits within respective source drivers, for example, the driving circuits DC[1] to DC[m] of the source driver IC1 and the driving circuits DC[1] to DC[z] of the source driver IC2, may use the common voltage bus VBUS to connect with each other. The respective source drivers are capable of transmitting the voltage signal to each other through the common voltage bus VBUS to adjust the voltages on their respective current control lines.

In the driving system shown in FIG. 6, taking the driving circuit DC[1] in the source driver IC1 as an example, in the compensating circuit of the driving circuit DC[1], when the switch 4SW3 is turned on according to the first control signal $VP_1$[1] (the switch 4SW4 is turned off according to the second control signal $VN_1$[1]), the voltage of the common voltage bus VBUS will increase due to current injection by the current source $I_P$, and when the switch 4SW4 is turned on according to the second control signal $VN_1$[1] (the switch 4SW3 is turned off according to the first control signal $VP_1$[1]), the voltage of the common voltage bus VBUS will decrease due to current discharge by the current source $I_N$.

The bus capacitor CBUS may be connected between the current control line VB1 of the driving circuit DC[1] of the source driver IC1 and the common voltage bus VBUS. The bus capacitor $C_{BUS}$ may be configured to convert a voltage change of the common voltage bus VBUS into a voltage change on the current control line VB1. However, since the voltage on the current control line is supplied by the buffer, the voltage on the current control line may remain at a constant value for most of the time, that is, there is a high frequency spike in the voltage on the current control line, and the voltage on the current control line remains at the constant value for the time other than the time period during which the high frequency spike occurs. In other words, the voltage on the current control line which the driving circuit DC[1] is connected with may change with the change of the voltage on the common voltage bus VBUS, and has a high frequency spike occurring around the time instant for state switching of the driving circuit DC[1], and then returns to a voltage with the constant value that depends on the voltage output by the buffer.

FIG. 7 shows changes of respective electrical parameters when the driving circuit DC[1] in the source driver IC1 switches from a non-driving state to a driving state (the PWM signal as the driving control signal changes from an inactive level to an active level) in the driving system shown in FIG. 6. In FIG. 7, changes of the electrical parameters (including the driving current, the voltage on the common voltage bus, and the voltage on the current control line, etc.) in the driving system not adopting the compensating circuit (as shown in FIG. 3 above) are represented by dashed line curves, and changes of the electrical parameters in the driving system adopting the compensating circuit are represented by solid line curves.

As described above with reference to FIG. 3, in a case where the compensating circuit is not adopted, when the scanning line $S_{IC1}$[1] is grounded through a corresponding scanning switch, the channels $C_{IC1}$[1] to $C_{IC1}$[m] corresponding to the source driver IC1 and the channels $C_{IC2}$[1] to $C_{IC2}$[z] corresponding to the source driver IC2 are turned on in a PWM mode to drive corresponding LEDs on a first row. However, as shown by the dashed line curves in FIG. 7, when the channel $C_{IC2}$[1] is turned on (in response to the PWM signal $PWM_2$[1]) and at time instant T0, the channel $C_{IC1}$[1] switches from being turned off to being turned on (in response to the PWM signal $PWM_1$[1]), the channel current $I_{C2[1]}$ will have an upward spike occurring with the voltage change on the channel $C_{IC1}$[1] due to the capacitive coupling paths on the LED panel. Specifically, with respect to the common scan structure shown in FIG. 3, when the channel $C_{IC1}$[1] switches from being turned off to being turned on at time instant T0, the channel voltage on the channel $C_{IC1}$[1] (for anodes of the LEDs in the channel $C_{IC1}$[1] (i.e., one end of the parasitic capacitor of each LED)) increases, and thus the voltages on the scanning lines $S_{IC1}$[2] to $S_{IC2}$[y] (connected to cathodes of the LEDs on the channel $C_{IC1}$[1] (i.e., the other one end of the parasitic capacitors of the LEDs)) increase due to coupling of the LED capacitors on the channel $C_{IC1}$[1] via the capacitive coupling paths (e.g., the paths (1)→(2) in FIG. 3). Since the scanning lines $S_{IC1}$[2] to $S_{IC2}$[y] are also connected to the cathodes of the LEDs on the channels $C_{IC1}$[2] to $C_{IC2}$[z], the voltages on the channels $C_{IC1}$[2] to $C_{IC2}$[z] (connected to the anodes of the LEDs on the channels $C_{IC1}$[2] to $C_{IC2}$[z]) increase due to coupling of the LED capacitors in the channels $C_{IC1}$[2] to $C_{IC2}$[z] via the capacitive coupling paths (e.g., the paths (2)→(3) in FIG. 3). When the scanning line $S_{IC1}$[1] is grounded via the corresponding scanning switch, the current flowing through the LED on the first row on the channel $C_{IC2}$[1] (i.e., the driving current on the channel $C_{IC2}$[1]) will also increase accordingly. As a result, even if the pulse width of the PWM signal $PWM_2$[1] for the channel $C_{IC2}$[1] corresponding to source driver IC2 (and/or the voltage on current control line VB2 of IC2) is fixed as an expected value, the corresponding LED on the first row on the channel $C_{IC2}$[1] is still brighter than expected.

As shown by the solid line curves in FIG. 7, at time instant T0, the driving circuit DC[1] of the source driver IC2 is being in the driving state, that is, the channel $C_{IC2}$[1] is turned on (e.g., in response to the PWM signal $PWM_2$[1] of the active level), and the driving circuit DC[1] of the source driver IC1 switches from the non-driving state to the driving state, that is, the channel $C_{IC1}$[1] switches from being turned off to being turned on (e.g., in response to the PWM signal $PWM_1$[1] that changes from the inactive level to the active level), the compensating circuit of the driving circuit DC[1] of the source driver IC1 may increase the voltage VBUS of the common voltage bus (e.g., make the charging circuit to charge the common voltage bus through the first control signal $VP_1$[1]), so the voltage of the common voltage bus VBUS of the source driver IC1 and source driver IC2 will increase. Since the voltage change of the common voltage bus VBUS may be coupled to the current control line VB2 of the driving circuit DC[1] of the source driver IC2 through the capacitor CBUS, the voltage on the current control line VB2 may increase instantaneously, forming a high frequency spike (as shown in the solid line). With the increase of the voltage on the current control line VB2, the constant-current transistor MPS of the driving circuit DC[1] of the source driver IC2 may output a current having a value instantaneously lower than the value as indicated by the dashed line curve, which may cancel out the sudden change of the driving current on the channel $C_{IC2}$[1] caused by the fact that the voltage change on the channel $C_{IC1}$[1] is coupled to the channel $C_{IC2}$[1] via capacitive coupling paths (e.g., the paths (1)→2)→(3) in FIG. 3), and may also cancel out the sudden change of the driving current $I_{C1[1]}$ caused by the fact that the parasitic capacitance at the constant-current transistor MPS interferes with the node voltage of the gate electrode of the constant-current transistor MPS (i.e., the voltage on the current control line VB1) when the channel $C_{IC1}$[1] switches between being turned on and being turned off, that is, implement compensation of the driving current $I_{C1[1]}$.

That is to say, as shown in FIG. 7, through the compensating circuit of the driving circuit DC[1] of the source driver IC1 and the driving circuit DC[1] of the source driver IC2, the voltage on the current control line VB2 around time instant T0 is shown by the solid line curve, which means that the voltage on the current control line VB2 will reach a peak around time instant T0. Accordingly, around time instant T0, the spike of the driving current $I_{C2[1]}$ being supplied on the channel $C_{IC2}$[1] (shown by the dashed line curve) is cancelled out, as shown by the solid line curve. In such case, the driving current $I_{C2[1]}$ remains almost unchanged around time instant T0, so brightness of the corresponding LED on the channel $C_{IC2}$[1] meets expectation.

If the channel $C_{IC2}$[1] is turned on, and more channels of the source driver IC1 and/or the source driver IC2 switch from being turned off to being turned on at time instant T0, then the driving current $I_{C2[1]}$ being supplied on the channel $C_{IC2}$[1] may have a greater sudden change (e.g., amplitude and/or span of the sudden change is greater) than the sudden change indicated by the dashed line curve shown in FIG. 7. However, similar to the solid line curve shown in FIG. 7, although capacitive coupling on the LED panel is stronger when more channels switch from being turned off to being turned on at time instant T0, more compensating circuits (each corresponding to one channel) will change the voltage on the common voltage bus VBUS to a greater extent, to cooperatively compensate the driving current $I_{C2[1]}$ being supplied to the channel $C_{IC2}$[1].

Similarly, FIG. 8 shows changes of respective electrical parameters when the driving circuit DC[1] in the source driver IC1 switches from a driving state to a non-driving state (the PWM signal changes from the active level to the inactive level) in the driving system shown in FIG. 6. In FIG. 8, changes of the electrical parameters (including the driving current, the voltage on the common voltage bus, and the voltage on the current control line, etc.) in the driving system not adopting the compensating circuit (as shown in FIG. 3 above) are represented by dashed line curves, and changes of the electrical parameters in the driving system adopting the compensating circuit are represented by solid line curves.

As described above with reference to FIG. 3, in a case where the compensating circuit is not adopted, when the scanning line $S_{IC1}$[1] is grounded through a corresponding scanning switch, the channels $C_{IC1}$[1] to $C_{IC1}$[m] corresponding to the source driver IC1 and the channels $C_{IC2}$[1] to $C_{IC2}$[z] corresponding to the source driver IC2 are turned on in a PWM mode to drive corresponding LEDs on a first row. However, as shown by the dashed line curves in FIG. 8, when the channel $C_{IC2}$[1] is turned on (in response to the PWM signal $PWM_2$[1]) and at time instant T1, the channel $C_{IC1}$[1] switches from being turned on to being turned off (in response to the PWM signal $PWM_1$[1]), the channel current $I_{C2[1]}$ will have a downward spike occurring with the voltage change on the channel $C_{IC1}$[1] due to the capacitive coupling paths on the LED panel. Specifically, as shown in FIG. 3, when the channel $C_{IC1}$[1] switches from being turned on to being turned off at time instant T1, the channel voltage on the channel $C_{IC1}$[1] (for anodes of the LEDs in the channel $C_{IC1}$[1]) decreases, so the voltages on the scanning lines $S_{IC1}$[2] to $S_{IC2}$[y] (connected to cathodes of the LEDs on the channel $C_{IC1}$[1]) decrease due to coupling of the LED capacitors on the channel $C_{IC1}$[1] via the capacitive coupling paths (e.g., the paths (1)→(2) in FIG. 3). Since the scanning lines $S_{IC1}$[2] to $S_{IC2}$[y] are also connected to the cathodes of the LEDs on the channels $C_{IC1}$[2] to $C_{IC2}$[z], the voltages on the channels $C_{IC1}$[2] to $C_{IC2}$[z] (connected to the anodes of the LEDs on the channels $C_{IC1}$[2] to $C_{IC2}$[z]) decrease due to coupling of the LED capacitors in the channels $C_{IC1}$[2] to $C_{IC2}$[z] via the capacitive coupling paths (e.g., the paths (2)→(3) in FIG. 3). When the scanning line $S_{IC1}$[1] is grounded via the corresponding scanning switch, the current flowing through the LED on the first row on the channel $C_{IC2}$[1] (i.e., the driving current on the channel $C_{IC2}$[1]) will also decrease accordingly. As a result, even if the pulse width of the PWM signal $PWM_2$[1] for the channel $C_{IC2}$[1] corresponding to the source driver IC2 (and/or the voltage on the current control line VB2 of IC2) is fixed as an expected value, the corresponding LED on the first row on the channel $C_{IC2}$[1] is still darker than expected.

As shown by the solid line curves in FIG. 8, at time instant T1, the driving circuit DC[1] of the source driver IC2 is being in the driving state, that is, the channel $C_{IC2}$[1] is turned on (e.g., in response to the PWM signal $PWM_2$[1] of the active level), and the driving circuit DC[1] of the source driver IC1 switches from the driving state to the non-driving state, that is, the channel $C_{IC1}$[1] switches from being turned on to being turned off (e.g., in response to the PWM signal $PWM_1$[1] that changes from the active level to the inactive level), the compensating circuit of the driving circuit DC[1] of the source driver IC1 may decrease the voltage of the common voltage bus VBUS (e.g., make the discharging circuit discharge the common voltage bus through the second control signal $VN_1$[1]), so the voltage of the common voltage bus VBUS of the source driver IC1 and the source driver IC2 will decrease. Since the voltage change of the common voltage bus VBUS may be coupled to the current control line VB2 of the driving circuit DC[1] of the source driver IC2 through the capacitor $C_{BUS}$, the voltage on the current control line VB2 may decrease instantaneously (as shown in the solid line). With the decrease of the voltage on the current control line VB2, the constant-current transistor MPS of the driving circuit DC[1] of the source driver IC2 may output a current having a value instantaneously higher than the value as indicated by the dashed line curve, which may cancel out the sudden change of the driving current on the channel $C_{IC2}$[1] caused by the fact that the voltage change on the channel $C_{IC1}$[1] is coupled to the channel $C_{IC2}$[1] via capacitive coupling paths (e.g., the paths (1)→(2)→(3) in FIG. 3), and may also cancel out the sudden change of the driving current $I_{C1[1]}$ caused by the fact that the parasitic capacitance at the constant-current transistor MPS interferes with the node voltage of the gate electrode of the constant-current transistor MPS (i.e., the voltage on the current control line VB1) when the channel $C_{IC1}$[1] switches between being turned off and being turned on, that is, implement compensation of the driving current $I_{C1[1]}$.

That is to say, as shown in FIG. 8, the voltage on the current control line VB2 around time instant T1 is shown by the solid line curve, which means that the voltage on the current control line VB2 will reach a valley around time instant T1. Accordingly, the sudden change (shown by the dashed line curve) of the driving current $I_{C2[1]}$ being supplied on the channel $C_{IC2}$[1] around time instant T1 is cancelled out, as shown by the solid line curve. In such case, the driving current $I_{C2[1]}$ remains almost unchanged around time instant T1, and brightness of the corresponding LED on the channel $C_{IC2}$[1] meets expectation.

If the channel $C_{IC2}$[1] is turned on, and more channels of the source driver IC1 and/or the source driver IC2 switch from being turned on to being turned off at time instant T1, then the driving current $I_{C2[1]}$ being supplied on the channel $C_{IC2}$[1] may have a greater sudden change (e.g., amplitude and/or span of the sudden change is greater) than the sudden change indicated by the dashed line curve shown in FIG. 8. However, similar to the solid line curve shown in FIG. 8, although capacitive coupling on the LED panel is stronger when more channels switch from being turned on to being turned off at time instant T1, more compensating circuits (each corresponding to one channel) will change the voltage on the common voltage bus VBUS to a greater extent, to cooperatively compensate the driving current $I_{C2[1]}$ being supplied on the channel $C_{IC2}$[1].

It should be noted that in the exemplary embodiments as described above with reference to FIG. 7 and FIG. 8, although it is illustrated by taking that the voltage on each current control line is adjusted by adjusting the voltage on the common voltage bus VBUS to implement the above-described compensation process of the driving currents as an example, the voltage on each current control line may be directly adjusted through the compensating circuit, as described above with reference to FIG. 5, and changes of related electrical parameters thereof (e.g., including the driving current and the voltage on the current control line) are also similar.

For example, at time instant T0, the driving circuit DC[1] of the source driver IC2 is being in the driving state, that is, the channel $C_{IC2}$[1] is turned on (e.g., in response to the PWM signal $PWM_2$[1] of the active level), and the driving circuit DC[1] of the source driver IC1 switches from the non-driving state to the driving state, that is, the channel $C_{IC1}$[1] switches from being turned off to being turned on (e.g., in response to the PWM signal $PWM_1$[1] that changes from the inactive level to the active level), the compensating circuit of the driving circuit DC[1] of the source driver IC1 may use the charging circuit thereof to charge the current control line VB2, so that the voltage on the current control line VB2 may increase instantaneously, forming a high frequency spike. With the increase of the voltage on the current control line VB2, the constant-current transistor MPS of the driving circuit DC[1] of the source driver IC2 may output a current having a value instantaneously lower than the value as indicated by the dashed line curve, which may cancel out the sudden change of the driving current on the channel $C_{IC2}$[1] caused by the fact that the voltage change on the channel $C_{IC1}$[1] is coupled to the channel $C_{IC2}$[1] via the capacitive coupling paths, and may also cancel out the sudden change of the driving current $I_{C1[1]}$ caused by the fact that the parasitic capacitance at the constant-current transistor MPS interferes with the node voltage of the gate electrode of the constant-current transistor MPS (i.e., the voltage on the current control line VB1) when the channel $C_{IC1}$[1] switches between being turned on and being turned off.

For another example, at time instant T1, the driving circuit DC[1] of the source driver IC2 is in the driving state, that is, the channel $C_{IC2}$[1] is turned on (e.g., in response to the PWM signal $PWM_2$[1] of the active level), and the driving circuit DC[1] of the source driver IC1 switches from the driving state to the non-driving state, that is, the channel $C_{IC1}$[1] switches from being turned on to being turned off (e.g., in response to the PWM signal $PWM_1$[1] changing from the active level to the inactive level), the compensating circuit of the driving circuit DC[1] of the source driver IC2 may use the discharging circuit thereof to discharge the current control line VB2, so that the voltage on the current control line VB2 may decrease instantaneously. With the decrease of the voltage on the current control line VB2, the constant-current transistor MPS of the driving circuit DC[1] of the source driver IC2 may output a current having a value instantaneously higher than the value as indicated by the dashed line curve, which may cancel out the sudden change of the driving current on the channel $C_{IC2}$[1] caused by the fact that the voltage change on the channel $C_{IC1}$[1] is connected to the channel $C_{IC2}$[1] via the capacitive coupling paths, and may also cancel out the sudden change of the driving current $I_{CI[1]}$ caused by the fact that the parasitic capacitance at the constant-current transistor MPS interferes with the node voltage of the gate electrode of the constant-current transistor MPS (i.e., the voltage on the current control line VB1) when the channel $C_{IC1}$[1] switches between being turned off and being turned on.

In the embodiment as described with reference to FIG. 5 to FIG. 8, the driving system is mainly based on a compensation mechanism having the compensating circuit arranged. As another exemplary embodiment, a driving current supplied by each driving circuit is also associated with the driving state duration indicated by the driving control signal (e.g., the pulse width of the PWM signal) for the driving circuit in addition to the voltage on the current control line which the driving circuit is connected with, so the driving current may be compensated by adjusting the driving state duration, for example, the compensation mechanism based on pulse width adjustment for the PWM signal may be used.

Figure 9:
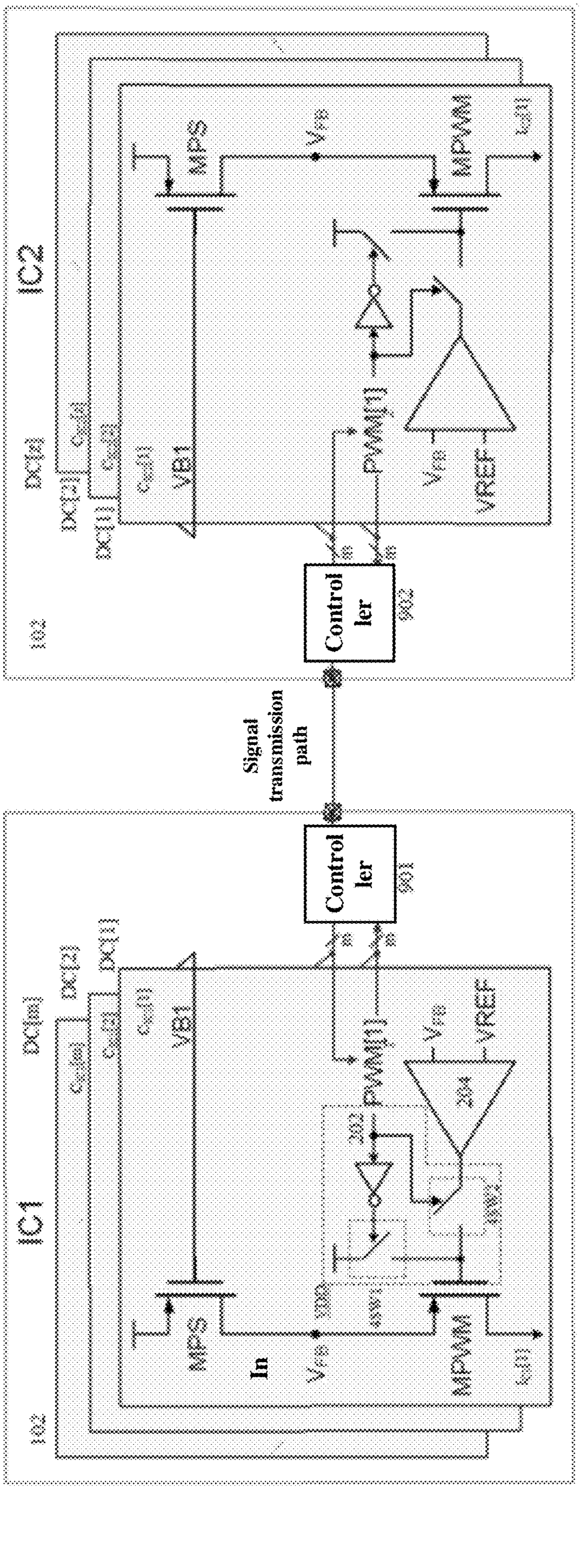
FIG. 9 shows a circuit schematic diagram of a driving system for driving an LED panel according to another embodiment of the present disclosure.

FIG. 9 shows another schematic diagram of the driving system, in which the driving system includes two source drivers IC1 and IC2 (or may include more source drivers), and each source driver includes a plurality of driving circuits DC[i].

In such case, the source drivers IC1 and IC2 may further respectively include controllers 901 and 902, each of which is for providing a corresponding driving control signal to each driving circuit included in the source driver IC1 or IC2, the driving control signal indicating a driving state and a non-driving state of a corresponding driving circuit. Hereinafter, it is illustrated by taking the PWM signal being as the driving control signal and taking the driving state duration indicated by the driving control signal depending on the pulse width of the PWM signal as an example. An active level and an inactive level of each PWM signal respectively indicate a driving state and a non-driving state of the corresponding driving circuit. Controllers included in source drivers IC1 and IC2 may have same structures and elements.

In addition, since a controller in each source driver may determine the pulse width of the PWM signals (a specific example of the driving state duration indicated by the driving control signal) provided to all the included driving circuits, for mutual communication between the controllers of respective source drivers, so that the controllers in respective source drivers may accordingly adjust the pulse width of the PWM signals provided to the driving circuits of first type, there is a signal transmission path between source drivers included in the driving system, for example, signal transmission is performed between the controllers respectively included in the source drivers.

For example, a controller of each source driver (IC1 or IC2) is configured to: when one or more driving circuits (e.g., the driving circuit DC[1]) of the source driver switch between the non-driving state and the driving state, adjust the pulse width of the PWM signal provided to the driving circuit(s) of first type (e.g., driving circuit DC[2]) in the source driver (IC1), to compensate the driving current being supplied by the driving circuit(s) of first type (e.g., the driving circuit DC[2]) in the source driver (IC1); and transmit an indication signal (e.g., which may be a digital square wave signal) to another source driver (e.g., the source driver IC2) via the signal transmission path between the source drivers, so that the controller included in the other source driver (e.g., the source driver IC2) adjusts the pulse width of the PWM signal provided to the driving circuit(s) of first type in the other source driver (e.g., the driving circuit DC[1] in source driver IC2), to compensate the driving current(s) being supplied by the driving circuit(s) of first type in the other source driver (e.g., the driving circuit DC[1] in the source driver IC2). Optionally, the signal transmission path may be a wireless or wired path, so the indication signal may be transmitted between the source drivers in a wired or wireless manner. The indication signal may be generated by a controller used for generating a PWM signal in each source driver or another independent controller.

For example, a controller of each source driver (IC1 or IC2) is configured to: when one or more driving circuits in the source driver (IC1 or IC2) switch from the non-driving state to the driving state, reduce the pulse width of the PWM signal for the driving circuit (s) of first type in the source driver (e.g., IC1) and transmit an indication signal for reducing the pulse width of the PWM signal for the driving circuit(s) of first type in another source driver (e.g., IC2) to the controller of the other source driver (e.g., IC2) via an information transmission path; and when one or more driving circuits in the source driver (IC1 or IC2) switch from the driving state to the non-driving state, increase the pulse width of the PWM signal for the driving circuit(s) of first type in the driving state in the source driver (e.g., IC1), and transmit an indication signal for increasing the pulse width of the PWM signal for the driving circuit(s) of first type in another source driver (e.g., IC2) to the controller of the other source driver (e.g., IC2) via the information transmission path.

As shown in FIG. 9, each driving circuit includes a driving current source and a driving current outputting circuit. The driving current source may be configured to supply a first current according to the voltage on the current control line which the driving circuit is connected with. The driving current outputting circuit may be configured to acquire the first current, acquire the PWM signal from the controller corresponding to the driving circuit, and output the driving current to the channel corresponding to the driving circuit based on the first current and according to the PWM signal.

For example, as shown in FIG. 9, respective driving circuits DC[1] to DC[m] in the source driver IC1 and/or respective driving circuits DC[1] to DC[z] in source driver IC2 each includes a constant-current source, for example, a constant-current transistor MPS, and the constant-current transistor MPS may supply a constant first current In according to the voltage on the current control line VB1 and/or VB2. Each driving circuit of respective driving circuits DC[1] to DC[m] in the source driver IC1 and/or respective driving circuits DC[1] to DC[z] in the source driver IC2 includes a driving current outputting circuit, and the driving current outputting circuit is configured to acquire a corresponding first current, acquire a PWM signal from the controller 901 or 902, and output a driving current to a channel corresponding to the driving circuit based on the first current and according to the PWM signal.

The controller 901 of the source driver IC1 may calculate and determine the pulse width of the PWM signal $PWM_1$[1] for the channel $C_{IC1}$[1] (i.e., a duration that the PWM transistor MPWM in the driving circuit DC[1] corresponding to the channel $C_{IC1}$[1] is turned on to output the driving current $I_{C1[1]}$). As an example, the controller 901 of the source driver IC1 may notify the other source driver IC of the operation thereof via the signal transmission path. For example, if the channel $C_{IC1}$[1] switches from being turned off to being turned on, which will potentially lead to a spike of the driving current $I_{C2[1]}$ as shown in the dashed line curve in FIG. 7 (if compensation is not performed), the controller 901 of the source driver IC1 transmits an indication signal to the controller 902 of the source driver IC2 to indicate the controller 902 to reduce the pulse width of the PWM signal $PWM_2$[1] for the channel $C_{IC2}$[1] (relative to the calculated theoretical pulse width of the PWM signal $PWM_2$[1] without compensation). If the channel $C_{IC1}$[1] switches from being turned on to being turned off, which will potentially lead to a decrease of the driving current $I_{C2[1]}$ as shown in the dashed line curve in FIG. 8, then the controller 901 of the source driver IC1 transmits an indication signal to the controller 902 of the source driver IC2 to indicate the controller 902 to increase the pulse width of the PWM signal $PWM_2$[1] for the channel $C_{IC2}$[1] (relative to the calculated theoretical pulse width of the PWM signal $PWM_2$[1] without compensation). Therefore, brightness of the corresponding LED on the channel $C_{IC2}$[1] may meet expectation.

Meanwhile, as described above, as shown by the dashed line curve of the voltage VB1 on the current control line in FIG. 7 and FIG. 8 above, considering the fact that when the channel switches between being turned on and being turned off, the parasitic capacitance at the constant-current transistor MPS may interfere with the node voltage of the gate electrode of the constant-current transistor MPS (i.e., the voltage on the current control line), when the controller initially determines or subsequently reduces or increases the pulse width of each PWM signal, the pulse width of the PWM signal may be adjusted comprehensively based on these factors.

Similar to the solid line curves shown in FIG. 7 or FIG. 8, although the capacitive coupling on the LED panel is stronger when more channels switch between being turned on and being turned off at time instant T0 or T1, the controllers in respective source drivers may change the pulse width of the PWM signals for respective driving circuits of first type to a greater extent to compensate all potential unexpected sudden changes in the driving currents that the driving circuits of first type output to channels.

In addition, the driving system as described above with reference to FIG. 5 to FIG. 9 has been illustrated by taking that two source drivers are included as an example. However, it should be understood that the driving system may include more than two source drivers, for example, in a case where they are used for driving a large-sized LED panel.

Figure 10:
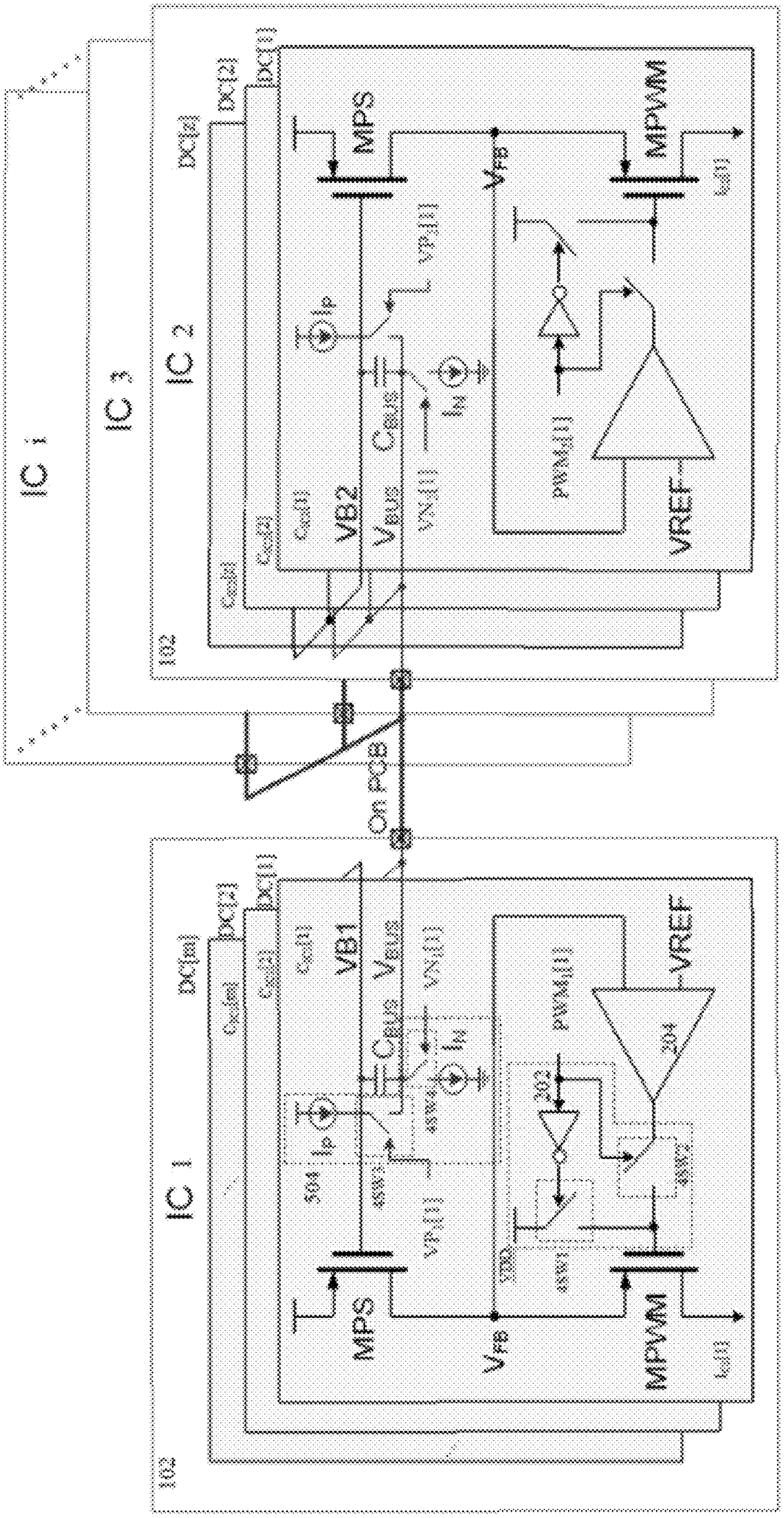
FIG. 10 shows a circuit schematic diagram of a driving system for driving an LED panel according to another embodiment of the present disclosure.

FIG. 10 shows a circuit schematic diagram of the driving system including more than two source drivers. These source drivers may be respectively integrated into an integrated circuit IC, so they are respectively represented as IC1, IC2, IC3, . . . , ICi.

In FIG. 10, circuit structures of respective driving circuits included in each source driver are the same as that described previously with reference to FIG. 6 (i.e., the circuit structure based on the common voltage bus). Of course, the respective driving circuits included in each source driver may also adopt other circuit structure, for example, the structure of the driving circuit shown in the driving system as described with reference to FIG. 5 or FIG. 9.

To sum up, in a case where the driving system includes a plurality of source drivers, through arranging a compensating circuit in each driving circuit included in respective source drivers and/or adjusting the driving state duration indicated by a driving control signal, and based on signal transmission via a signal transmission path between different source drivers (e.g., the transmission of the voltage signal via the common voltage bus, or the transmission of the control signal or indication signal via other signal transmission paths, etc.), the driving current(s) being supplied by the driving circuit(s) of first type in respective source drivers on the corresponding channel(s) may be compensated, so as to further reduce the driving current changes and the LED brightness changes caused thereby.

Although the foregoing content is related to the case where the driving system includes a plurality of source drivers, and exemplarily shows the example of solving the problem of interference that may be caused by the capacitive coupling paths between different channels in different source drivers, this is not intended to limit the present disclosure. In other embodiments of the present disclosure, the problem of interference between different channels in a single source driver may also be solved in a similar way.

For example, with respect to the mechanism based on the compensating circuit, the channel $C_{IC2}$[1] of the source driver IC2 in FIG. 5 may be considered as a channel of the source driver IC1. When the compensating circuit of the driving circuit DC[1] of the source driver IC1 starts to operate, as the corresponding channel of the driving circuit DC[1] switches between being turned on and being turned off, the driving currents being supplied by the source driver IC1 may all be compensated. That is to say, the description of respective channels included in the foregoing respective source drivers is applicable to respective channels in a single source driver.

Thus, in these embodiments, the source driver used for driving the LED panel may include a plurality of driving circuits, and the plurality of driving circuits may be in one-to-one correspondence with the plurality of channels on the LED panel, and connected to a same current control line and a same common voltage bus.

Each driving circuit among the plurality of driving circuits includes: a bus capacitor, connected between the current control line and the common voltage bus; a driving current generating circuit, configured to supply a driving current to a corresponding channel according to the voltage on the current control line; and a compensating circuit, connected to the common voltage bus, and configured to compensate the voltage on the current control line via a path including the bus capacitor through adjusting the voltage on the common voltage bus, when the driving circuit switches between the non-driving state and the driving state, so that the driving current(s) being supplied by the driving circuit(s) of first type is compensated, wherein the driving circuit(s) of first type is being in the driving state.

A circuit structure of each driving circuit may be the same as or similar to the circuit structure of the driving circuit as described previously with reference to FIG. 5, so no details will be repeated here.

Or, since only a single source driver is included in such case, there is no need for signal transmission between source drivers. Therefore, each source driver may not include the common voltage bus, but the compensating circuit is directly connected with the current control line, so as to directly control the voltage on the current control line.

For another example, with respect to the mechanism based on adjusting the driving state duration indicated by the driving control signal, the controller in a single source driver may calculate and determine the driving state duration indicated by the driving control signal (e.g., the pulse width of the PWM signal) for each driving circuit in the source driver, so when a certain number of channels driven by one or more driving circuits among the plurality of driving circuits of the source driver switch between being turned on and being turned off, the controller may control and adjust the driving state duration (e.g., the pulse width of PWM signal) indicated by the driving control signal(s) for the driving circuit(s) being in the driving state (the driving circuit(s) of first type) among the plurality of driving circuits.

Thus, in these embodiments, the source driver for driving the LED panel may include a plurality of driving circuits and a controller. The plurality of driving circuits are in one-to-one correspondence with the plurality of channels on the LED panel, and are connected to a same current control line. The controller may be used for providing, to each driving circuit, a driving control signal (e.g., a PWM signal). Each driving circuit includes a driving current generating circuit, configured to supply a driving current to a corresponding channel according to the voltage on the current control line and the driving control signal (e.g., the PWM signal) provided by the controller. When one or more driving circuits among the plurality of driving circuits switch between the non-driving state and the driving state, the controller adjusts the driving state duration indicated by the driving control signal(s) (e.g., the pulse width of the PWM signal(s)) for a driving circuit(s) of first type, so that the driving current(s) being supplied by the driving circuit(s) of first type can be compensated.

For example, when the one or more driving circuits among the plurality of driving circuits switch from the non-driving state to the driving state, the controller reduces the pulse width of the current PWM signal(s) for the driving circuit (s) of first type, and when the one or more driving circuits among the plurality of driving circuits switch from the driving state to the non-driving state, the controller increases the pulse width of the current PWM signal(s) for the driving circuit(s) of first type.

At this time, each driving circuit may adopt the circuit structure of the driving circuit in the driving system as shown in FIG. 9.

That is to say, in a case where only a single source driver is used for driving the LED panel, a compensating circuit may be arranged in each driving circuit included in the source driver and/or the controller for the source driver may be used, to compensate the driving current(s) being supplied by the driving circuit (s) of first type in the single source driver, to further reduce the driving current changes and LED brightness changes.

In addition, although the above content separately describes the mechanism based on the compensating circuit and the mechanism based on adjusting the driving state duration indicated by the driving control signal to implement the compensation operation, yet in other embodiments, the two mechanisms may be combined.

For example, when one or more driving circuits switch between the driving state and the non-driving state, the compensating circuit may be used to compensate the voltage on the current control line, and the controller may also be used for adjusting the driving state duration indicated by the driving control signal. For example, when the one or more driving circuits switch from the non-driving state to the driving state, the voltage on the current control line may be adjusted by using the compensating circuit (or the voltage on the current control line may be adjusted via the common voltage bus), to reduce the driving current(s) being supplied by the driving circuit(s) of first type (which may be distributed in a single source driver or different source drivers included in the driving system), and the controller reduces the driving state duration indicated by the driving control signal(s) (e.g., the pulse width of the PWM signal(s)) for the driving circuit(s) of first type. On the contrary, the compensating circuit may be used for adjusting the voltage on the current control line to increase the driving current(s) being supplied by the driving circuit(s) of first type (which may be distributed in a single source driver or different source drivers included in the driving system), and the controller increases the driving state duration indicated by the driving control signal(s) (e.g., the pulse width of the PWM signal(s)) for the driving circuit(s) of first type in the driving state. Specific voltage adjustment amount (e.g., based on charging and discharging time) and pulse width adjustment amount may be determined by the controller.

According to another aspect of the present disclosure, there is further provided an LED display system.

Figure 11:
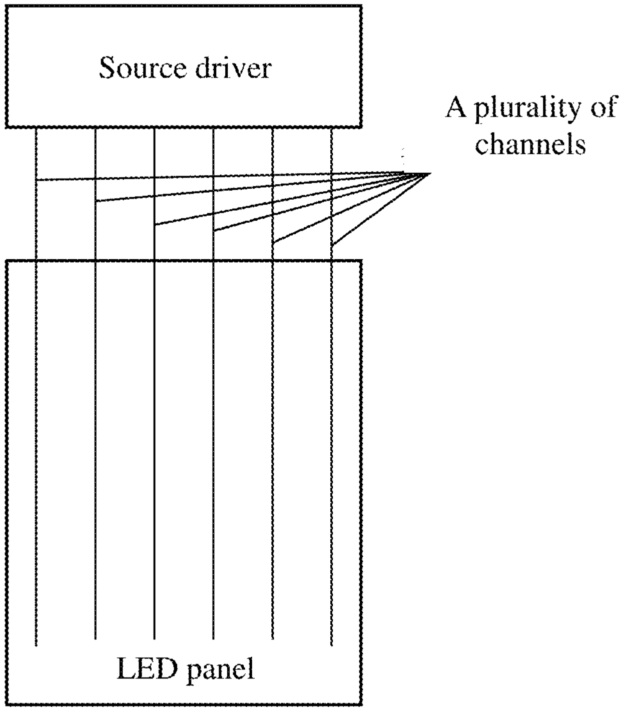
FIG. 11 to FIG. 12 respectively show structural schematic diagrams of an LED display system according to an embodiment of the present disclosure.

FIG. 11 shows a structural schematic diagram of the LED display system according to the embodiment of the present disclosure. The LED display system has a similar structure to the LED display system as described with reference to FIG. 1.

For example, the LED display system includes: an LED panel, wherein, the LED panel includes a plurality of channels, and each channel is connected with a plurality of LED; and a source driver for driving the LED panel. The source driver may have features of a compensation mechanism for compensating the driving current(s) being supplied by the driving circuit(s) being in the driving state (driving circuit(s) of first type) included in the source driver as described above.

Figure 12:
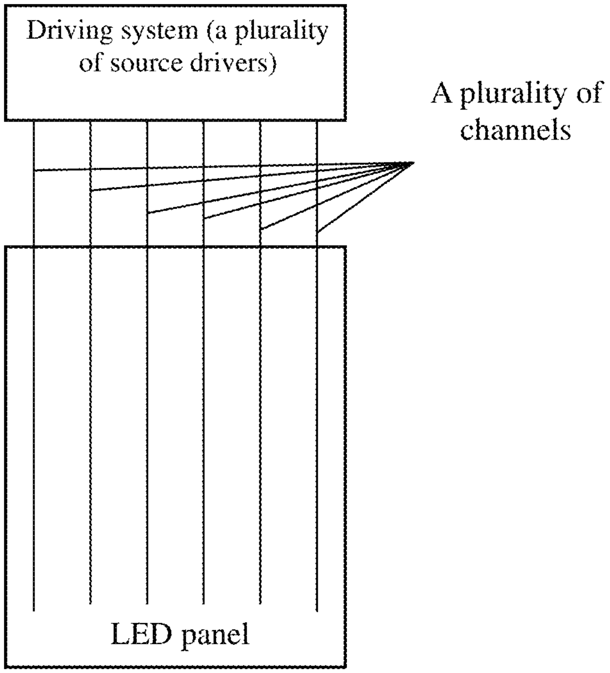

FIG. 12 shows a structural schematic diagram of the LED display system according to the embodiment of the present disclosure. The LED display system has a similar structure to the LED display system as described with reference to FIG. 3.

For example, the LED display system includes: an LED panel, wherein, the LED panel includes a plurality of channels, and each channel is connected with a plurality of LED; and a driving system including at least two source drivers, which is used for driving the LED panel. The driving system may be the driving system as described previously with reference to FIG. 5 to FIG. 9, that is, the driving system have features of a compensation mechanism for compensating the driving currents being supplied by the driving circuit(s) being in the driving state (driving circuit(s) of first type) included in the at least two source drivers.

In this way, because the LED display system includes a source driver based on the compensation mechanism, display brightness of the LED display system will be relatively uniform, thereby having a relatively good display effect.

In the present disclosure, the controller may be a processing apparatus having functions such as signal/parameter processing and calculation, and may be an integrated circuit chip. The processing apparatus may also process or calculate other signals/parameters. The above-described processing apparatus may include a general-purpose processor, a Digital Signal Processor (DSP), an Application Specific Integrated Circuit (ASIC), a Field Programmable Gate Array (FPGA) or other programmable logic device, a discrete gate or a transistor logic device, and a discrete hardware component. The general-purpose processor may be a microprocessor, or the processor any also be any conventional processor, etc., which may be of X99 architecture or ARM architecture. In addition, the processing apparatus may also be combined with a memory to execute operations. Computer-readable instructions are stored on the memory, and the processing apparatus may execute the computer-readable instructions on the memory to execute required processing/calculation operations for signals/parameters.

Several points below need to be explained:

(1) The drawings of the embodiments of the present disclosure relate only to the structures involved in the embodiments of the present disclosure, and normal designs may be referred to for other structures.

(2) In case of no conflict, the embodiments of the present disclosure and the features in the embodiments may be combined with each other to obtain a new embodiment.

The above are only specific embodiments of the present disclosure, but the scope of the embodiment of the present disclosure is not limited thereto, and the scope of the present disclosure should be the scope of the following claims.

The invention claimed is:

1. A driving system for driving an LED panel, comprising:

a plurality of source drivers, used for respectively supplying driving currents to channels of different portions on the LED panel, each source driver comprising:

a plurality of driving circuits, which are in one-to-one correspondence with channels on the LED panel, and are connected to a same current control line, each driving circuit being configured to supply a driving current to a corresponding channel, and the supplied driving current being associated with a voltage on the current control line;

wherein, when one or more driving circuits in the plurality of source drivers switch between a non-driving state and a driving state, the driving current being supplied by a driving circuit of first type in the plurality of source drivers is compensated, wherein the driving circuit of first type is being in the driving state, wherein, for each driving circuit of first type, the driving current being provided by the driving circuit of first type is compensated by adjusting a voltage on the current control line connected with the driving circuit of first type, or by adjusting driving state duration of the driving circuit of first type.

2. The driving system according to claim 1, wherein, each driving circuit comprises:

a driving current generating circuit, configured to supply the driving current to the corresponding channel according to the voltage on the current control line which the driving circuit is connected with; and a compensating circuit, configured to: when the driving circuit switches between the non-driving state and the driving state, adjust the voltage on the current control line which the driving circuit is connected with, so that the driving current being supplied by the driving circuit of first type is compensated.

3. The driving system according to claim 2, wherein, the driving current generating circuit included in each driving circuit comprises:

a driving current source, configured to supply a first current according to the voltage on the current control line which the driving circuit is connected with; and a driving current outputting circuit, configured to output the driving current based on the first current and a driving control signal, the driving control signal being used for indicating the driving state and the non-driving state of the driving circuit.

4. The driving system according to claim 3, wherein, the compensating circuit included in each driving circuit is connected to the current control line which the driving circuit is connected with, and is configured to:

adjust the voltage on the current control line which the driving circuit is connected with, when the driving circuit switches from the non-driving state to the driving state, and/or when the driving circuit switches from the driving state to the non-driving state.

5. The driving system according to claim 4, further comprising: a signal transmission path between the plurality of source drivers, wherein, the compensating circuit included in each driving circuit comprises:

a voltage adjusting sub-circuit, configured to increase the voltage on the current control line which the driving circuit is connected with according to a first control signal, or reduce the voltage on the current control line which the driving circuit is connected with according to a second control signal, wherein, the first control signal or the second control signal applied to each driving circuit is transmitted from a source driver where the driving circuit is located to another source driver via the signal transmission path, for the compensating circuit included in a driving circuit in the other source driver to adjust the voltage on the current control line in the other source driver.

6. The driving system according to claim 2, further comprising: a common voltage bus, connected between the plurality of source drivers, wherein, the plurality of driving circuits included in each source driver are also connected to the common voltage bus, and each driving circuit further comprises a bus capacitor connected between the current control line which the driving circuit is connected with and the common voltage bus, wherein, the compensating circuit included in each driving circuit is connected to the common voltage bus, and configured to adjust, by adjusting the voltage of the common voltage bus and via a path including the bus capacitor, the voltage on the current control line in each source driver.

7. The driving system according to claim 6, wherein, the compensating circuit included in each driving circuit comprises:

a voltage adjusting sub-circuit, configured to increase the voltage on the common voltage bus according to a first control signal to increase the voltage on the current control line in each source driver; or reduce the voltage on the common voltage bus according to a second control signal to reduce the voltage on the current control line in each source driver.

8. The driving system according to claim 1, further comprising a signal transmission path between the plurality of source drivers, wherein, each source driver further comprises a controller configured to provide a driving control signal to each driving circuit included in the source driver, and each driving control signal is used for indicating the driving state and the non-driving state of a corresponding driving circuit; and wherein the driving current supplied by each driving circuit is also associated with a driving state duration indicated by the driving control signal for the driving circuit.

9. The driving system according to claim 8, wherein, each driving circuit comprises:

a driving current source, configured to supply a first current according to the voltage on the current control line which the driving circuit is connected with; and a driving current outputting circuit, configured to output the driving current based on the first current and the driving control signal for the driving circuit.

10. The driving system according to claim 8, wherein, the controller of each source driver is configured to: when one or more driving circuits of the source driver switch between the non-driving state and the driving state, adjust the driving state duration indicated by the driving control signal for the driving circuit of first type in the source driver; and transmit an indication signal to another source driver via the signal transmission path, so that the controller included in the other source driver adjusts the driving state duration indicated by the driving control signal for a driving circuit of first type in the other source driver.

11. A source driver for driving an LED panel, comprising:

a plurality of driving circuits, which are in one-to-one correspondence with a plurality of channels on the LED panel, and connected to a same current control line and a same common voltage bus, wherein, each driving circuit of the plurality of driving circuits comprises:

a bus capacitor, connected between the current control line and the common voltage bus;

a driving current generating circuit, configured to supply a driving current to a corresponding channel according to a voltage on the current control line; and a compensating circuit, connected to the common voltage bus, and configured to adjust, by adjusting the voltage on the common voltage bus and via a path including the bus capacitor, the voltage on the current control line, when the driving circuit switches between a non-driving state and a driving state, so that the driving current being supplied by a driving circuit of first type among the plurality of driving circuits is compensated, wherein the driving circuit of first type is being in the driving state.

12. The source driver according to claim 11, wherein, the driving current generating circuit included in each driving circuit comprises:

a driving current source, configured to supply a first current according to the voltage on the current control line; and a driving current outputting circuit, configured to output the driving current based on the first current and a driving control signal, the driving control signal being used for indicating the driving state and the non-driving state of the driving circuit.

13. The source driver according to claim 12, wherein, the compensating circuit included in each driving circuit is configured to:

adjust, by adjusting the voltage on the common voltage bus, the voltage on the current control line, when the driving circuit switches from the non-driving state to the driving state, and/or when the driving circuit switches from the driving state to the non-driving state.

14. The source driver according to claim 13, wherein, the compensating circuit included in each driving circuit comprises:

a voltage adjusting sub-circuit, connected to the common voltage bus, and configured to increase the voltage on the common voltage bus according to a first control signal, or reduce the voltage on the common voltage bus according to a second control signal.

15. The source driver according to claim 14, wherein, the voltage adjusting sub-circuit comprises:

a charging circuit, configured to charge the common voltage bus according to the first control signal, so as to increase the voltage on the common voltage bus; and a discharging circuit, configured to discharge the common voltage bus according to the second control signal, so as to reduce the voltage on the common voltage bus.

16. The source driver according to claim 11, further comprising: a controller, configured to supply a driving control signal to each of the plurality of driving circuits, wherein, the driving current generating circuit included in each driving circuit is configured to output the driving current according to the voltage on the current control line and the driving control signal for the driving circuit, wherein, when one or more driving circuits among the plurality of driving circuits switch between the non-driving state and the driving state, the controller is configured to adjust a driving state duration indicated by the driving control signal for the driving circuit of first type, so that the driving current being supplied by the driving circuit of first type is compensated.

17. A source driver for driving an LED panel, comprising:

a plurality of driving circuits, which are in one-to-one correspondence with a plurality of channels on the LED panel, and are connected to a same current control line; and a controller, configured to provide a driving control signal to each of the plurality of driving circuits, the driving control signal being used for indicating a driving state and a non-driving state of a corresponding driving circuit;

wherein, each driving circuit comprises a driving current generating circuit, and is configured to output a driving current according to a voltage on the current control line and the driving control signal for the driving circuit;

wherein, the controller is configured to: when one or more driving circuits among the plurality of driving circuits switch between the non-driving state and the driving state, adjust a driving state duration indicated by the driving control signal for a driving circuit of first type among the plurality of driving circuits, so that the driving current being supplied by the driving circuit of first type is compensated, wherein the driving circuit of first type is being in the driving state.

18. The source driver according to claim 17, wherein, the driving current generating circuit included in each driving circuit comprises:

a driving current source, configured to supply a first current according to the voltage on the current control line; and a driving current outputting circuit, configured to output the driving current based on the first current and the driving control signal for the driving circuit.

19. The source driver according to claim 18, wherein, the controller is further configured to: when the one or more driving circuits switch from the non-driving state to the driving state, reduce the driving state duration indicated by the driving control signal for the driving circuit of first type, and when the one or more driving circuits switch from the driving state to the non-driving state, increase the driving state duration indicated by the driving control signal for the driving circuit of first type.

20. An LED display system, comprising:

an LED panel, wherein, the LED panel comprises a plurality of channels, and each channel is connected with a plurality of LEDs; and the driving system according to claim 1, used for driving the LED panel.

* * * * *